US011559900B2

(12) United States Patent
Correll et al.

(10) Patent No.: US 11,559,900 B2
(45) Date of Patent: Jan. 24, 2023

(54) SYSTEMS, DEVICES, COMPONENTS, AND METHODS FOR A COMPACT ROBOTIC GRIPPER WITH PALM-MOUNTED SENSING, GRASPING, AND COMPUTING DEVICES AND COMPONENTS

(71) Applicant: Robotic Materials, Inc., Boulder, CO (US)

(72) Inventors: Nikolaus J. Correll, Boulder, CO (US); Austin K. Miller, Boulder, CO (US); Branden Romero, Brighton, MA (US)

(73) Assignee: RMI

( * ) Notice: Subject to any disclaimer, the term of this patent is extended or adjusted under 35 U.S.C. 154(b) by 0 days.

(21) Appl. No.: 17/467,051

(22) Filed: Sep. 3, 2021

(65) Prior Publication Data
US 2021/0394367 A1 Dec. 23, 2021

Related U.S. Application Data

(63) Continuation of application No. 16/376,938, filed on Apr. 5, 2019, now Pat. No. 11,148,295.

(51) Int. Cl.
*B25J 9/16* (2006.01)
*B25J 9/10* (2006.01)
*B25J 15/10* (2006.01)

(52) U.S. Cl.
CPC ............. *B25J 9/1697* (2013.01); *B25J 9/106* (2013.01); *B25J 9/1664* (2013.01); *B25J 15/10* (2013.01)

(58) Field of Classification Search
CPC ........ B25J 9/1697; B25J 9/106; B25J 9/1664; B25J 15/10
(Continued)

(56) References Cited

U.S. PATENT DOCUMENTS

| 9,533,419 B1 * | 1/2017 | Strauss | B25J 15/0033 |
| 9,605,952 B2 * | 3/2017 | Rose | B25J 9/1612 |

(Continued)

*Primary Examiner* — Jaime Figueroa
(74) *Attorney, Agent, or Firm* — Woods Patent Law, P.C.

(57) ABSTRACT

Disclosed are various embodiments of a three-dimensional perception and object manipulation robot gripper configured for connection to and operation in conjunction with a robot arm. In some embodiments, the gripper comprises a palm, a plurality of motors or actuators operably connected to the palm, a mechanical manipulation system operably connected to the palm, a plurality of fingers operably connected to the motors or actuators and configured to manipulate one or more objects located within a workspace or target volume that can be accessed by the fingers. A depth camera system is also operably connected to the palm. One or more computing devices are operably connected to the depth camera and are configured and programmed to process images provided by the depth camera system to determine the location and orientation of the one or more objects within a workspace, and in accordance therewith, provide as outputs therefrom control signals or instructions configured to be employed by the motors or actuators to control movement and operation of the plurality of fingers so as to permit the fingers to manipulate the one or more objects located within the workspace or target volume. The gripper can also be configured to vary controllably at least one of a force, a torque, a stiffness, and a compliance applied by one or more of the plurality of fingers to the one or more objects.

36 Claims, 15 Drawing Sheets

(58) Field of Classification Search
USPC .......................................................... 700/259
See application file for complete search history.

(56) References Cited

U.S. PATENT DOCUMENTS

| | | | | |
|---|---|---|---|---|
| 10,065,309 | B2* | 9/2018 | Rose | ................. B25J 15/10 |
| 10,682,774 | B2* | 6/2020 | Bingham | ............. B25J 15/0213 |
| 10,864,641 | B2* | 12/2020 | Leidenfrost | ............ B25J 15/106 |
| 10,967,507 | B2* | 4/2021 | Homberg | ............... B25J 9/1664 |
| 11,345,040 | B2* | 5/2022 | Oleynik | ............. G05B 19/4183 |
| 2003/0130759 | A1* | 7/2003 | Kesil | ..................... B25J 9/1633 |
| | | | | 700/192 |
| 2015/0019013 | A1* | 1/2015 | Rose | ........................ B25J 13/08 |
| | | | | 702/41 |
| 2017/0182657 | A1* | 6/2017 | Rose | .................. B25J 15/0028 |
| 2017/0274539 | A1* | 9/2017 | Maeda | ..................... B25J 15/10 |
| 2019/0168396 | A1* | 6/2019 | Leidenfrost | ............ B25J 9/1697 |
| 2019/0176348 | A1* | 6/2019 | Bingham | ............... B25J 9/1612 |
| 2019/0291277 | A1* | 9/2019 | Oleynik | ................ B25J 9/1697 |
| 2019/0337152 | A1* | 11/2019 | Homberg | ............... B25J 9/1697 |

\* cited by examiner

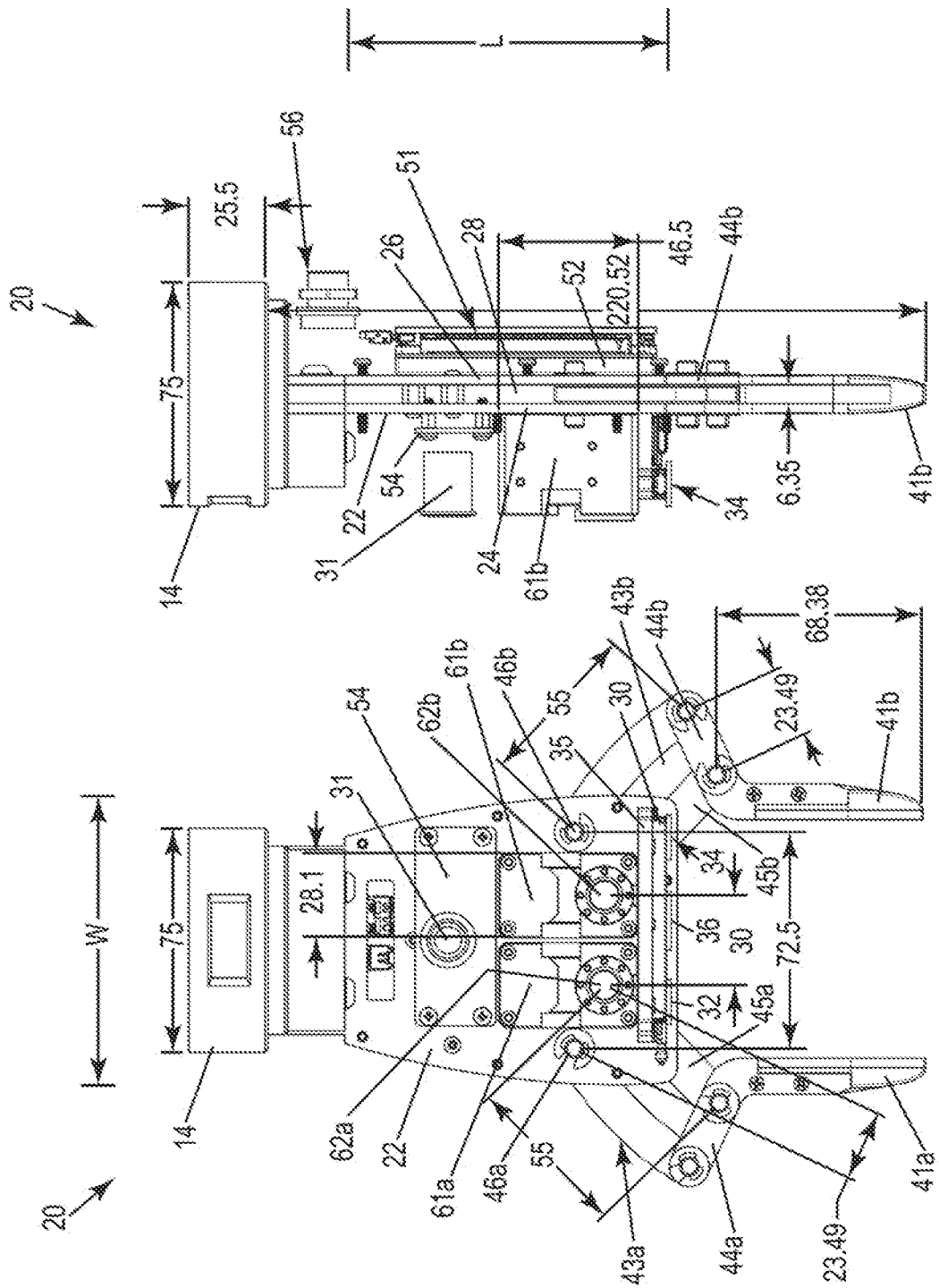

SYSTEMS, DEVICES, COMPONENTS, AND METHODS FOR A COMPACT ROBOTIC GRIPPER WITH PALM-MOUNTED SENSING, GRASPING, AND COMPUTING DEVICES AND COMPONENTS

PRIORITY, BENEFITS AND CROSS-REFERENCES TO RELATED APPLICATIONS

This patent application is a continuation application of parent U.S. patent application Ser. No. 16/376,938 filed on Apr. 5, 2019 entitled "Systems, Devices, Components, and Methods for a Compact Robotic Gripper with Palm-Mounted Sensing, Grasping, and Computing Devices and Components" to Dr. Nikolaus Correll ("the '938 parent patent application"), and claims priority and other benefits therefrom. The '938 parent patent application is hereby incorporated by reference herein, in its entirety, to provide continuity of disclosure.

Through the '938 parent patent application, this application also claims priority and other benefits from: (a) U.S. Provisional Patent Application Ser. No. 62/744,855 filed on Oct. 12, 2018 entitled "Robotic Rotating Tool for Screwing and Drilling with Attachment Mechanism" to Miller et al. (hereafter "the '855 patent application"), (b) U.S. Provisional Patent Application Ser. No. 62/686,055 filed on Jun. 17, 2018 entitled "A Robotic Hand with Integrated 3D Perception and Individually Controlled Fingers for Autonomous Manipulation" to Miller et al. (hereafter "the '055 patent application"), and (c) U.S. Provisional Patent Application Ser. No. 62/767,044 filed on Nov. 14, 2018 entitled "Systems, Devices, Components, and Methods for a Rotatable Robotic Gripper with Stereo Infrared Cameras and Infrared Projector" to Correll et al. (hereafter "the '044 patent application"). The respective entireties of the '855, '055 and '044 patent applications are hereby incorporated by reference herein to provide continuity of disclosure.

ACKNOWLEDGEMENTS

Some aspects of the various embodiments of the inventions described herein were made with government support under grant number 1746003, awarded by the National Science Foundation. The government has certain rights in the invention.

STATEMENT REGARDING PRIOR DISCLOSURES BY INVENTOR(S)

Some aspects of the various embodiments described herein have been depicted in a series of videos on youtube.com and www.roboticmaterials.com since Apr. 15, 2018 by the inventors.

BACKGROUND

Autonomous robotic manipulation requires a robot to perceive an object in space, grasp it and subsequently manipulate its pose for the object to be in the right position to interact with other objects. For example, when screwing in a screw, a robot might need to localize the screw, pick it up, insert it into a hole, and then twist the screw. This requires not only knowing where the screw is located, but also exactly how it is oriented so that the robot can pick it up at its head. Similarly, grasping a screw driver to subsequently manipulate a screw requires grasping the screw driver by the handle with the tip pointing away from the robot. The robot therefore requires the capability to sense the 3D structure of an object at about one millimeter resolution or less. At the same time, however, one millimeter resolution is not sufficient to insert a small screw (for example an M3 screw with a 3 mm diameter) into a tight hole. Such tasks therefore cannot generally be performed by autonomous robots.

The specific task of determining the pose of an object in an image, stereo image, or image sequence is referred to as pose estimation. The pose estimation problem can be solved in different ways depending on image sensor configuration and choice of methodology.

One approach to pose estimation problems is to mount an optical system having the ability to acquire 3D spatial information in the workspace or work cell of the robot, for example by using stereo vision devices, LIDAR, or structured light. Installed above the robot's workspace, these systems are generally incapable of providing the resolution required by a robot to perceive small objects. Also, as the robot at least occasionally shields the camera system during operation, the robot usually needs to move outside of the work cell during perception, which increases cycle time and introduces uncertainty during manipulation because the robot is effectively operating blindly and cannot react dynamically to changes occurring in the environment that are beyond its view. Further complicating the pose estimation problem is the fact that nearly all optical systems are characterized by calibration errors that need to be accounted for, and which are often non-linear and of different magnitudes at different locations within the workspace.

Some of these problems can be overcome at least partially by mounting a single optical sensor close to the robot's end-effector, such as the arm, wrist, or palm of the robot. By doing so, calibration errors can sometimes remain substantially constant, and the optical sensor can be brought relatively close to an object of interest (which increases the system's sensing and handling accuracy). Unfortunately, wrist and arm mounted optical systems typically reduce the workspace available to the robot due to increased size of the system and also increase the occurrence of collisions of the fragile camera system with the robot itself or objects in the environment. Prior art palm-integrated monocular cameras are also typically characterized by a significant shortfall of lacking depth sensing ability.

To properly compensate and adjust for the alignment and position of an object within the workspace of the robot during contact, wrist-mounted load cells are commonly employed. Wrist-mounted load cells provide a robot with the ability to measure forces and torques in all three dimensions, and have proved useful for peg-in-hole insertion tasks (such as setting a screw). In such an application, the gripper needs to be as stiff as possible so that forces can be appropriately transduced to the wrist while whole body motions manipulate the wrist pose until the peg has been inserted successfully into the hole. Whole-body motions require both time and energy, and are therefore undesirable. An alternative approach is to lower the stiffness of the robotic gripper to increase compliance. Indeed, manipulation often requires a robot hand to have the ability to assume a wide range of stiffnesses. For example, tightening a screw requires a gripper to be very stiff, whereas picking up a fruit requires a gripper to exert just as much force as is necessary to lift the object but not squish it. This is commonly achieved by making grippers from different materials. For example, applications that require a stiff gripper can employ metal or hard plastics, whereas applications that require a soft gripper can use an inflatable bellow configured to conform around the object. While these techniques solve the requirements of a specific application, a gripper that has been specifically designed and configured for one type of task typically cannot be applied to another type of tasks.

Varying the stiffness in a robotic gripper can also be employed to correct inaccuracies in robotic perception. Instead of requiring that an object's exact location be determined, a soft gripper can grasp (or begin to grasp) an object by knowing only an approximate location and pose of the object, and then conforming its shape around the object. Such gripper designs, however, typically have difficulty manipulating an object successfully. For example, while a soft gripper might be successful picking up a small object like a screw without knowing its exact location, the same gripper might not be capable precisely inserting the screw into a hole and tightening it. This is because the robot does not know exactly where the object is located in the workspace, and also because intrinsic compliance does not permit the robot to exert sufficient force on the object. Consequently, it would be desirable if a gripper could change or switch its stiffness during operation.

The amount of data arising from 3D sensing is large. For example, last-generation 3D sensors generate data on the order of Gigabits per second. With robots requiring high-resolution perception all around their bodies, routing and processing such an amount of information is highly burdensome. Modern robots such as autonomous cars typically require dozens of computers to process such large amounts of data. This is not a feasible technical solution for a mobile robotic arm that needs to be physically much smaller in size than an autonomous car and that also requires a much reduced energy budget.

What is needed is a robotic gripper that has improved perception, gripping, computational, manipulation, and autonomous capabilities.

SUMMARY

The various embodiments disclosed and described herein include systems, devices, components and methods associated with a robot system.

In some embodiments, there is provided a three-dimensional perception and object manipulation robot gripper configured for connection to and operation in conjunction with a robot arm. The gripper comprises a palm comprising a plurality of at least one of mounting surfaces, attachment surfaces, mounting points, attachment points, mounting mechanisms, and attachment mechanisms, or combination of such surfaces, points, or mechanisms, a plurality of at least one of motors and actuators mounted to, on or in, or attached to, on or in the palm, a mechanical manipulation system attached to, on or in, or operably connected, to the palm, the mechanical manipulation system comprising a plurality of fingers and being operably connected to the motors or actuators, the plurality of fingers being configured to manipulate one or more objects located within a workspace or target volume that can be accessed by the fingers, at least one light projector mounted to, on or in, or connected operably, to the palm, the light projector being configured to illuminate at least partially with light having predetermined characteristics the one or more objects located within the workspace or target volume, at least two camera sensors mounted to, on or in, or connected operably to, the palm and configured and positioned to sense at least one of reflected and backscattered light having the predetermined characteristics and originating from the light projector, the at least two camera sensors further being configured to generate and provide input images or signals corresponding to the reflected and backscattered light sensed thereby, a first computing device operably connected to the at least one light projector and the at least two camera sensors, the first computing device being mounted to, on, or in, or connected operably to, the palm and configured to: (a) at least partially one of control operation, control activation, and control deactivation of the at least two camera sensors and the projector; (b) receive and at least partially process or format the input images or signals provided by the at least two camera sensors, and (c) generate and provide output images corresponding at least partially to the input images or signals provided by the at least two camera sensors, and a second computing device mounted to, on or in, or connected operably to, the palm, the second computing device being operably connected to the first computing device and to the plurality of at least one of motors and actuators, the second computing device being configured to receive the output images provided by the first computing device, and further being configured and programmed to process the output images to determine the location and orientation of the one or more objects within the workspace, and in accordance therewith provide as outputs therefrom control signals or instructions configured to be employed by the motors or actuators to control movement and operation of the plurality of fingers so as to permit the fingers to manipulate the one or more objects located within the workspace or target volume, wherein the gripper is configured to rotate or translate in conjunction with a movable robot wrist and robot arm operably connected thereto, and the gripper is configured such that during object grasping, releasing, and moving operations the plurality of fingers operate within a predetermined operational range of distances and angles that define the boundaries of the workspace and target volume.

The foregoing embodiments may further comprise any one or more of: (1) the mechanical manipulation system comprising a plurality of mechanical linkage mechanisms; (2) the mechanical linkage mechanism being a four-bar linkage mechanism; (3) the light having predetermined characteristics comprising one or more of infrared light, visible light, and UV light; (4) one or more of the first, second and third computing devices comprising a single or dual computing device; (5) the gripper being configured such that the plurality of fingers are independently controllable; (6) at least one of the plurality of fingers being a finger having a shape, a length, a width, a portion or component, a predetermined function, a hardness or softness, and a surface area that can be changed or switched by a user; (7) the palm comprising at least one planar surface comprising the at least one of mounting surfaces, attachment surfaces, mounting points, attachment points, mounting mechanisms, and attachment mechanisms, or combination of such surfaces, points, or mechanisms; (8) at least one planar surface of the palm comprising upper and lower plates; (9) at least one planar surface of the palm comprising at least one of metal, a metal alloy or combination of metals, a plastic, a polymer, laminated materials, carbon, carbon fiber, a carbon-reinforced material or composite, KEVLAR, and DELRIN; (10) the at least one of motors and actuators comprising one or more of a DC electric motor, a digital servo motor, a pneumatic or hydraulic piston, a solenoid, a reduction gear, a position or orientation sensor, a force sensor, and a torque sensor; (11) the at least one of motors and actuators being operably connected to a third computing device or motor or actuator controller comprising a feedback controller, where the third computing device is configured to regulate or control at least one of position, force, and torque applied by the plurality of fingers to the one or more objects; (11) the robot gripper or hand being operably connected to a graphical programming interface accessible by a user or programmer, (12) a graphical programming interface being provided by a web browser; (13) the gripper being configured to vary controllably at least one of a force, a torque, a stiffness, and a compliance applied by one or more of the plurality of fingers to the one or more objects; and (1) the lengths, widths, and surface areas of palm 22 falling within the ranges disclosed and described herein.

In other embodiments, there is provided a method of manipulating an object located in a workspace using a three-dimensional perception and object manipulation robot gripper configured for connection to and operation in conjunction with a robot arm, the gripper comprising a palm comprising a plurality of at least one of mounting surfaces, attachment surfaces, mounting points, attachment points, mounting mechanisms, and attachment mechanisms, or combination of such surfaces, points, or mechanisms, a plurality of at least one of motors and actuators mounted to, on or in, or attached to, on or in the palm, a mechanical manipulation system attached to, on or in, or operably connected, to the palm, the mechanical manipulation system comprising a plurality of fingers and being operably connected to the motors or actuators, the plurality of fingers being configured to manipulate one or more objects located within a workspace or target volume that can be accessed by the fingers, at least one light projector mounted to, on or in, or connected operably, to the palm, the light projector being configured to illuminate at least partially with light having predetermined characteristics the one or more objects located within the workspace or target volume, at least two camera sensors mounted to, on or in, or connected operably to, the palm and configured and positioned to sense at least one of reflected and backscattered light having the predetermined characteristics and originating from the light projector, the at least two camera sensors further being configured to generate and provide input images or signals corresponding to the reflected and backscattered light sensed thereby, a first computing device operably connected to the at least one light projector and the at least two camera sensors, the first computing device being mounted to, on, or in, or connected operably to, the palm and configured to: (a) at least partially one of control operation, control activation, and control deactivation of the at least two camera sensors and the projector; (b) receive and at least partially process or format the input images or signals provided by the at least two camera sensors, and (c) generate and provide output images corresponding at least partially to the input images or signals provided by the at least two camera sensors, and a second computing device mounted to, on or in, or connected operably to, the palm, the second computing device being operably connected to the first computing device and to the plurality of at least one of motors and actuators, the second computing device being configured to receive the output images provided by the first computing device, and further being configured and programmed to process the output images to determine the location and orientation of the one or more objects within the workspace, and in accordance therewith provide as outputs therefrom control signals or instructions configured to be employed by the motors or actuators to control movement and operation of the plurality of fingers so as to permit the fingers to manipulate the one or more objects located within the workspace or target volume, the method comprising rotating or translating the gripper such that during object grasping, releasing, and moving operations the plurality of fingers operate within a predetermined operational range of distances and angles that define the boundaries of the workspace and target volume.

The foregoing other embodiments may further comprise any one or more of: (1) using a plurality of mechanical linkage mechanisms as the mechanical manipulation system; (2) using a four-bar linkage mechanism as the mechanical linkage mechanism; (3) the light having predetermined characteristics being one or more of infrared light, visible light, and UV light; (4) one or more of the first, second and third computing devices comprising a single or dual computing device; (5) the plurality of fingers being independently controllable; (6) at least one of the plurality of fingers is a finger having a shape, a length, a width, a portion or component, a predetermined function, a hardness or softness, and a surface area that can be changed or switched by a user; (7) the palm comprising at least one planar surface comprising the at least one of mounting surfaces, attachment surfaces, mounting points, attachment points, mounting mechanisms, and attachment mechanisms, or combination of such surfaces, points, or mechanisms; (8) the at least one planar surface of the palm comprises upper and lower plates; (9) the at least one planar surface of the palm comprises at least one of metal, a metal alloy or combination of metals, a plastic, a polymer, laminated materials, carbon, carbon fiber, a carbon-reinforced material or composite, KEVLAR, and DELRIN; (10) at least one of motors and actuators comprising one or more of a DC electric motor, a digital servo motor, a pneumatic or hydraulic piston, a solenoid, a reduction gear, a position or orientation sensor, a force sensor, and a torque sensor; (11) the at least one of motors and actuators being operably connected to a third computing device or motor or actuator controller comprising a feedback controller, where the third computing device is configured to regulate or control at least one of position, force, and torque applied by the plurality of fingers to the one or more objects; (12) the robot gripper or hand being operably connected to a graphical programming interface accessible by a user or programmer, (13) the graphical programming interface being provided by a web browser; and (14) the gripper being configured to vary controllably at least one of a force, a torque, a stiffness, and a compliance applied by one or more of the plurality of fingers to the one or more objects.

BRIEF DESCRIPTION OF THE DRAWINGS

Different aspects of the various embodiments will become apparent from the following specification, drawings and claims in which:

FIGS. 7a, 7b and 8 show various portions, aspects and some non-limiting illustrative dimensions of gripper 20;

The drawings are not necessarily to scale. Like numbers refer to like parts or steps throughout the drawings.

DETAILED DESCRIPTIONS OF SOME EMBODIMENTS

The various embodiments can be understood more readily by reference to the following detailed description, examples, and claims, and their previous and following description. Before the present system, devices, and/or methods are disclosed and described, it is to be understood that various embodiments are not limited to the specific systems, devices, and/or methods disclosed unless otherwise specified, as such can, of course, vary. It is also to be understood that the terminology used herein is for the purpose of describing particular aspects only and is not intended to be limiting.

The following description of the various embodiments is provided as an enabling teaching of the various embodiments. Those skilled in the relevant art will recognize that many changes can be made to the aspects and features disclosed explicitly herein while still obtaining the beneficial results of the various embodiments. It will also be apparent that some of the desired benefits of the various embodiments can be obtained by selecting some of the features of the present invention without utilizing other features. Accordingly, those who work in the art will recognize that many modifications and adaptions to the various embodiments are possible and even desirable in certain circumstances, and are part of the present invention. Thus, the following description is provided as being illustrative of the principles of the various embodiments and not in limitation thereof.

As used herein, the singular forms "a", "an" and "the" include the plural referents unless the context clearly dictates otherwise. Thus, for example, reference to a "finger" includes aspects having two or more such fingers unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about", it will be understood that the particular value forms another aspect. It will be further understood that the endpoints of each of the ranges are significant both in relation to the other endpoint and independently of the other endpoint.

Figure 1:
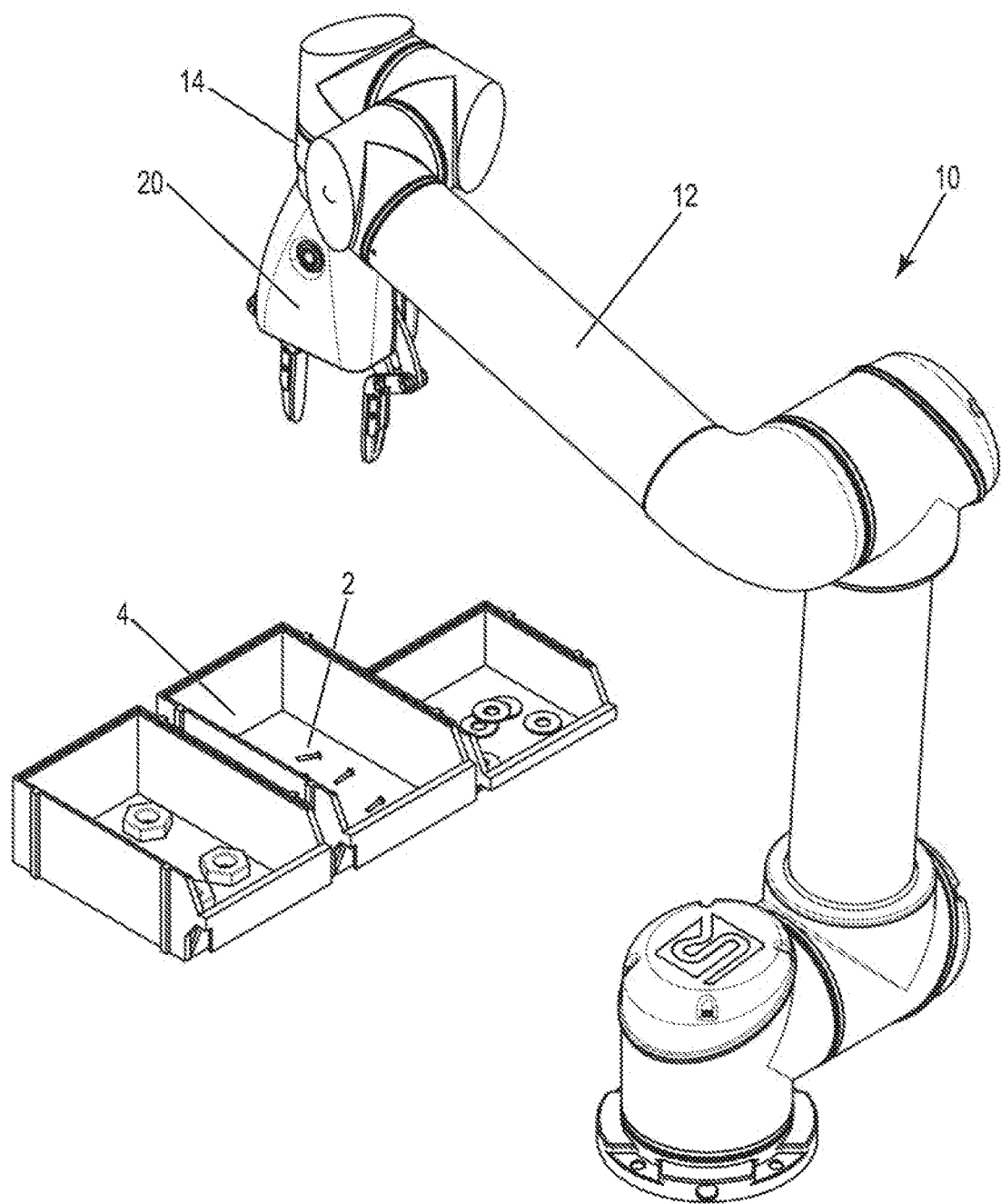
FIG. 1 shows robot 10 engaged in a "bin picking" task.

Referring now to FIG. 1, there is shown one embodiment of robot 10 comprising robotic arm 12, robotic wrist 14, and robotic gripper or hand 20. Robot 10 is shown situated such that gripper 20 can perform bin picking tasks, where objects 2 are grasped and manipulated by robotic gripper 20 and robot 10.

In one embodiment corresponding to FIG. 1, and by way of illustrative example, robotic gripper 20 is mounted on a UR-series robotic arm 12 having six degrees of freedom (DoF), where arm 12 is manufactured by Universal Robots of Denmark. Other types and models of robotic arm 12 are also contemplated. See, for example, the following publications from Universal Robots of Odense, Denmark, complete copies of which are filed with the present patent application in an Information Disclosure Statement, the respective entireties of which are hereby incorporated by reference herein: (a) a data sheet entitled "Technical Details" for Universal Robots UR5 robotic arm; (b) an 11-page technical brochure entitled "The future is collaborative;" (c) a data sheet entitled "UR5e Technical Details" for Universal Robots UR5e robotic arm; and (d) a 12-page technical brochure entitled "e-Series from Universal Robots—World's #1 Collaborative Robot," Other embodiments of robot 10 comprise arms 12 having more or less than six DoF. For example, arm 12 with seven DoF can be configured to reach all poses an arm 12 with six DoF can reach, albeit with additional redundancy. In other embodiments and applications, arm 12 with only three DoF might suffice, for example when items or objects 2 are picked exclusively from above.

FIG. 1 shows robot 10 engaged in a "bin picking" task, which involves retrieving items such as screws from bin 25. Here, robot 10 is shown in a configuration that puts gripper 20 comprising cameras 32 and 34 and a light illumination device 36 (not shown in FIG. 1) above bin 4, which in the illustrative embodiment of FIG. 1 features a workspace or target volume within which object(s) are situated or located, where the workspace or target volume has an extent or distance associated therewith which ranges between about 11 cm and about 30 cm from the forward or sensing portion of gripper 20. Other extents or distances from gripper 20 for the workspace or target volume of gripper 20 are also contemplated. In one embodiment, when gripper 20 is farther away from object 2 than a predetermined range of distances (e.g., 11-30 cm), stereo camera resolution, which by way of illustrative example in some embodiments is up to 1280×720 pixels, is sufficient to detect a small object 2 such as M3 screw shown in FIG. 1. As further shown in FIG. 1, in one embodiment gripper or hand 20 is configured to extend outwardly and away from robotic arm 12.

In one embodiment, gripper 20 is configured to sense and manipulate three-dimensional objects 2 located within its corresponding workspace or target volume 74, which can extend from gripper 20 multiple meters or cubic meters. Gripper 20 can also be configured to check the surrounding of robot 10 for obstacles. For example, gripper 20 can be configured to check whether the airspace or volume above bin 25 is collision-free before allowing robot 10 to move into such airspace or volume. In one embodiment, gripper 20 is configured to retrieve its exact pose relative to the base of robot 10 by querying robot 10's state. (in the case of a UR5 arm 12, the accuracy of pose estimation is about 0.1 mm.) Three-dimensional information regarding the environment surrounding or in the vicinity of robot 10 can therefore be generated and/or received in a compatible coordinate system by robot 10 and/or gripper 20, and can be easily stitched together without employing additional or computationally-intensive algorithms.

Figure 2:
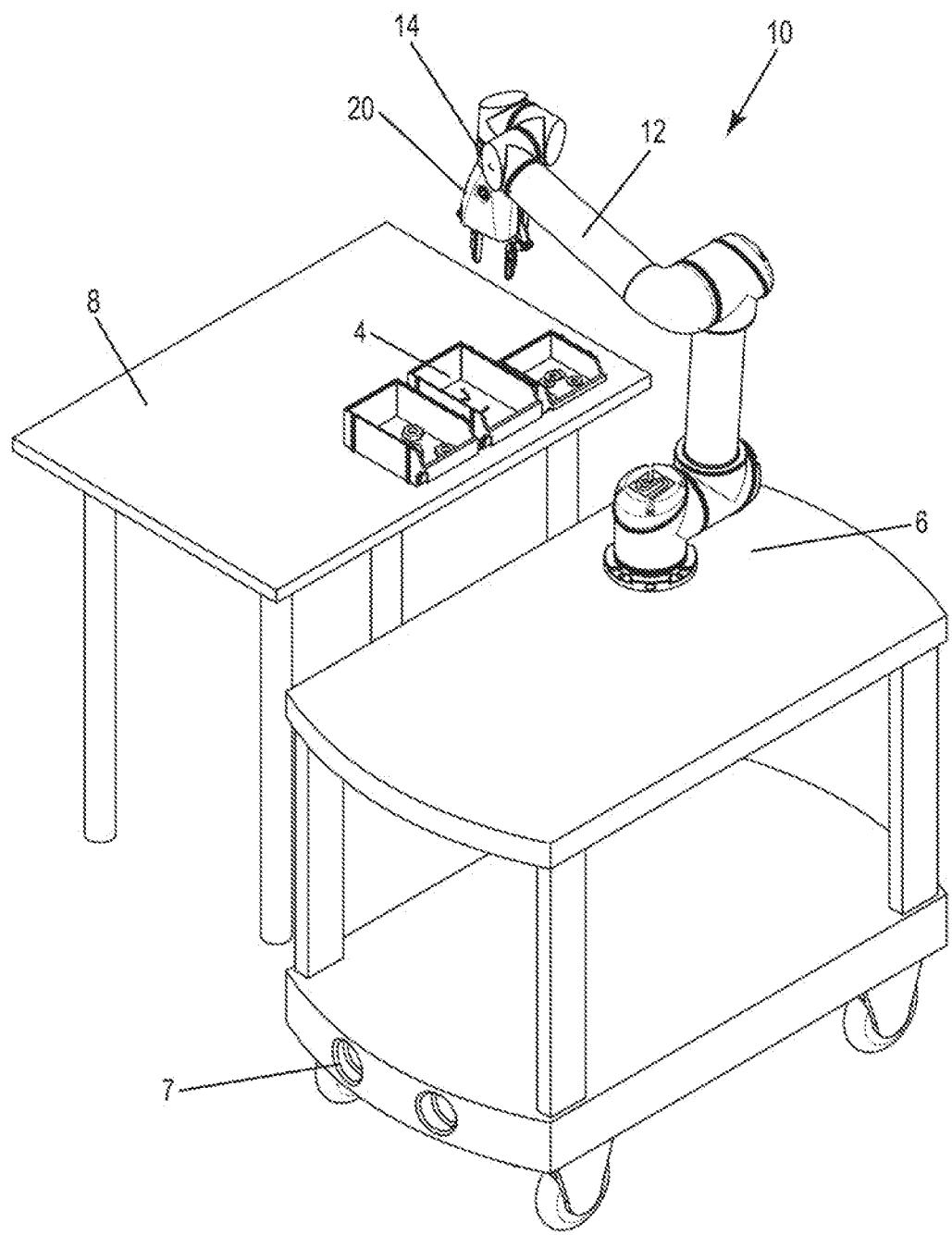
FIG. 2 shows one embodiment of robot 10 mounted on autonomous cart 6.

FIG. 2 shows one embodiment of robot 10 mounted on autonomous cart 6, which comprises navigation sensors 7 provided as part of a system configured to provide self-driving or autonomous movement of capability to cart 6. In FIG. 2, robot 10 is shown in a position to pick and place, or grasp and manipulate, objects 2 in bins 4, which are located atop table 8. In such an embodiment, robotic arm 12 and robot 10 are mounted on autonomous cart 6 provided, for example, by Canvas Technology located in Boulder, Colo. Cart 26 is configured to navigate to specific waypoints, which are provided by a position and orientation to an accuracy on the order of centimeters. Such accuracy is sufficient for gripper 20 to localize bin 4 and objects 2 disposed therein, and to perform autonomous grasping and manipulation functions. In other embodiments, gripper 20 is mounted on a cart 6 that utilizes an application programming interface via a wired or wireless network that permits gripper 20 to issue commands such as "move to waypoint X," or to query cart 6's state.

As gripper 20 can be configured to provide three-dimensional information up to a range of multiple meters, three-dimensional information from gripper 20 can also be used to augment cart 6's built-in sensors 7. For example, gripper 20 can be configured to check predetermined volumes of space for navigability that are at a height not relevant for cart 6 during normal operations. For example, in a situation like that shown in FIG. 2, gripper 20 can be configured to check whether the space or volume above bin 5 is navigable prior to moving arm 12 into the space. This can be done by simply checking for the presence of any interfering three-dimensional voxels that might be present in the volume. Similarly, gripper 20 can be configured to augment cart 6's sensory capabilities when cart 6 is stationary or moving.

Figure 3:
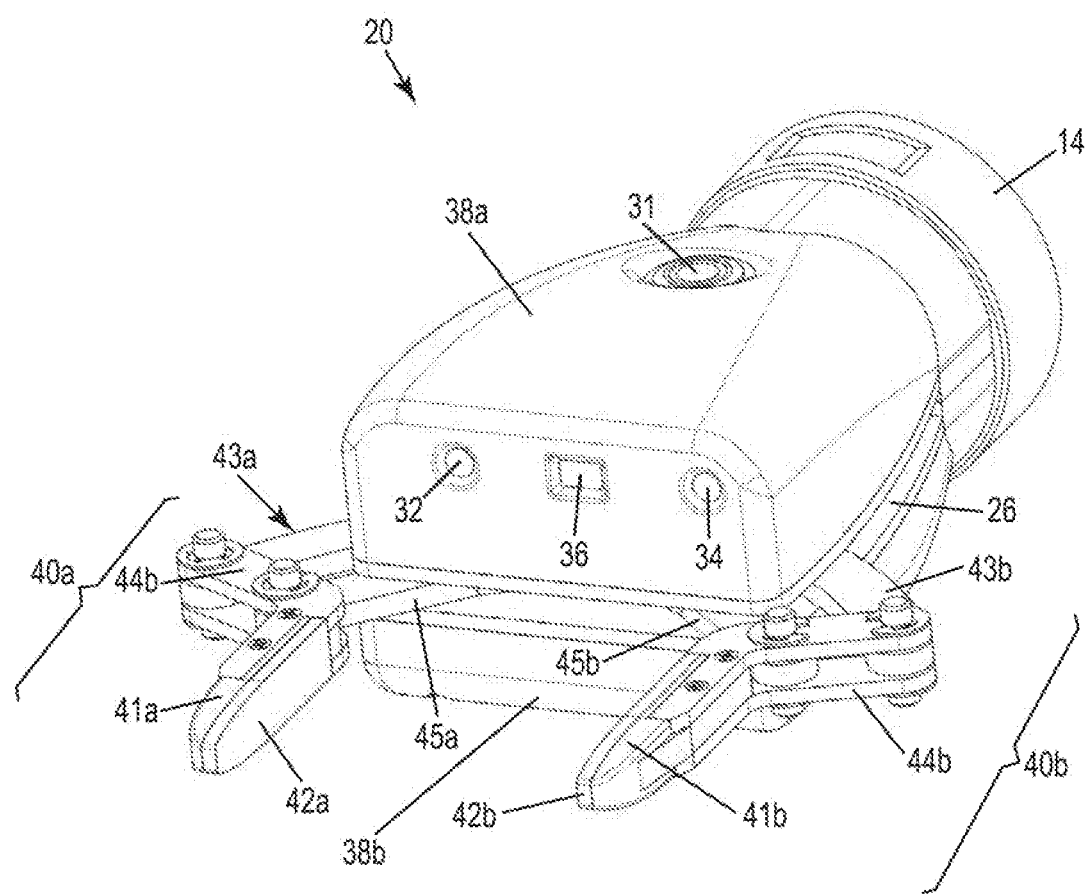
FIG. 3 shows one embodiment of gripper 20 operably attached to robotic wrist 14.

FIG. 3 shows one embodiment of gripper 20 operably attached to robotic wrist 14. In one embodiment, and in conjunction with light projector 36, camera sensors 32 and 34 are configured to provide stereo-vision capabilities for gripper 20, more about which is said below. In FIG. 3, fingers 41a and 41b of mechanical manipulation system 40a and 40b are shown disposed in an open position. In some embodiments, fingers 41a and 41b comprise surfaces or pads 42a and 42b, which can be removed and replaced with pads or surfaces 42a and 42b of different stiffnesses or compliance. In FIG. 3, fingers 41a and 41 are configured to engage and grasp objects therebetween, and to permit the manipulation of objects 2 by gripper 20. Links 42a and 42b (not shown in FIG. 3), 43a and 44b, and 45a and 45b of mechanical manipulation system 40 are configured to open and close fingers 41a and 41b in conjunction with motors or actuators 61a and 61b (not shown in FIG. 3). Upper and lower housings or enclosures 38a and 38b protect and shield various internally-disposed components of gripper 20, such as palm 22, motors 61a and 61b, and other components of gripper 20 that are not visible in FIG. 3. With respect to FIG. 3, FIG. 4 shows gripper 20 with finger 41b having moved independently of Finger 41a into a new position.

Figure 4:
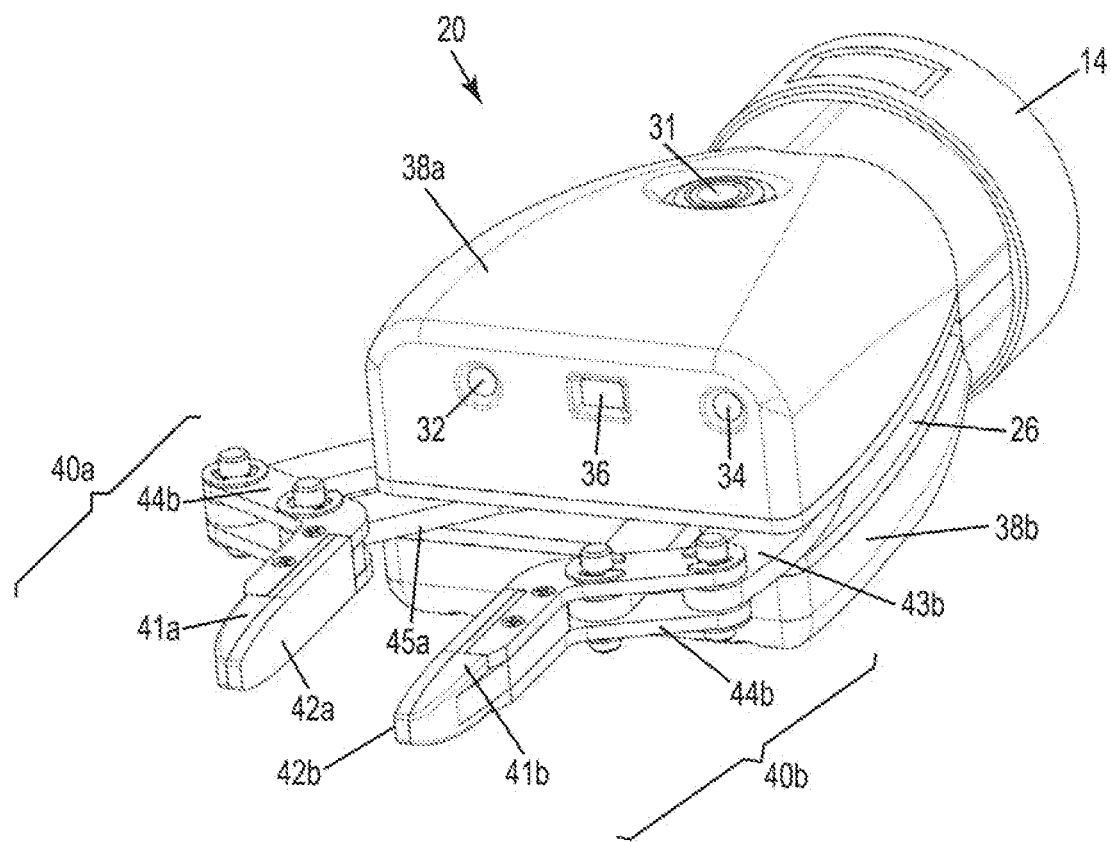
FIG. 4 shows the embodiment of gripper 20 of FIG. 3 with finger 41b in a different position.

In FIGS. 3 and 4, and in one embodiment, optional push button 31 can be employed and configured to serve as a user interface to turn gripper 20 on or off, to trigger the opening or closing of gripper 20, and/or to perform other high-level functions. In one embodiment, push-button 31 is operably connected to third computing device or interface board 54, which can be configured to monitor button 31's state using much less energy than second computing device or system-on-a-module 52. When interface board 54 detects specific sequences, for example a press that lasts longer than 3 seconds, interface board 54 can be configured to turn system-on-a-module 52 on or off. In other embodiments, gripper 20 can be configured to turn on or off automatically when power is provided thereto, to use torque and position sensing in fingers 41a and 41b to detect user input, or to use at least one of the camera sensors 32 and 34 to determine the meaning of user gestures.

Figure 5:
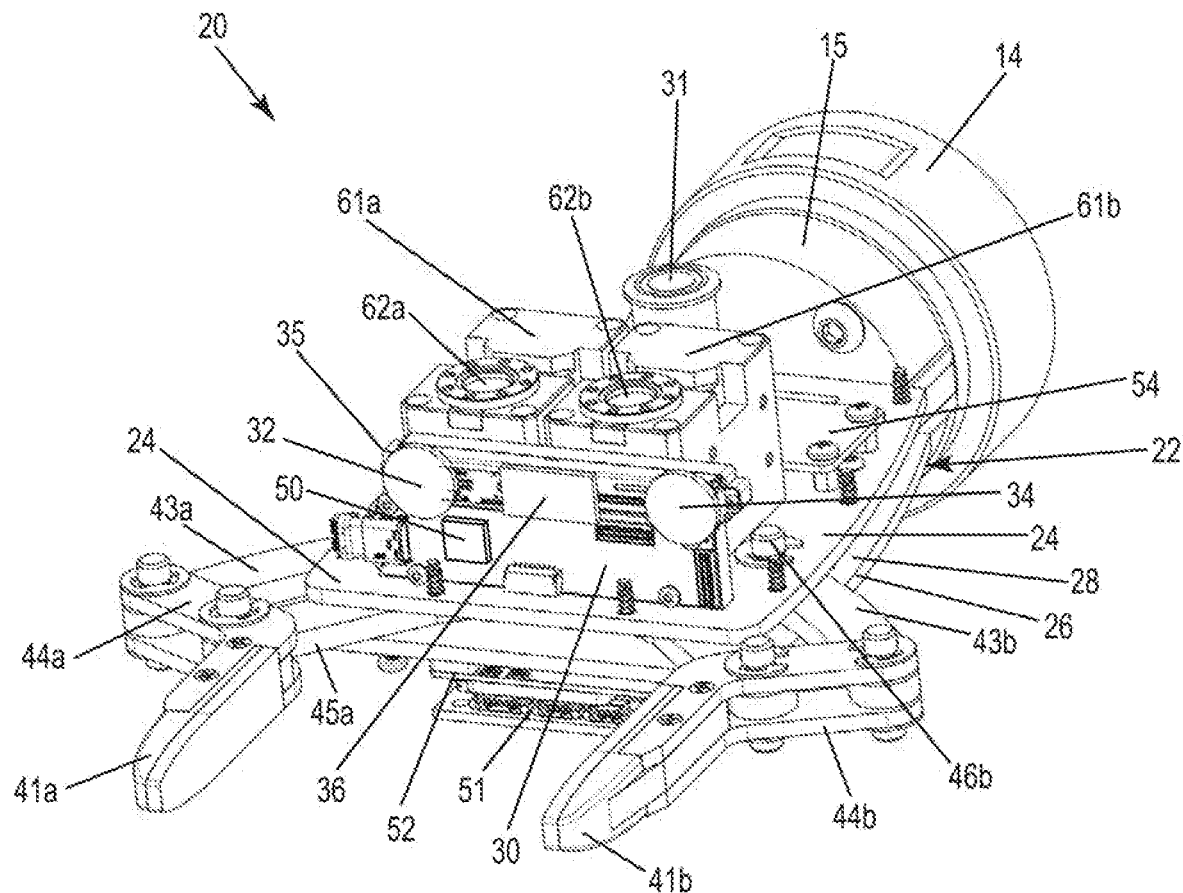
FIG. 5 shows the embodiment of gripper 20 shown in FIGS. 3 and 4 with enclosures or housings 38a and 38b removed therefrom.

FIG. 5 shows the embodiment of gripper 20 shown in FIGS. 3 and 4 with enclosures or housings 38a and 38b removed therefrom, which reveals further components and parts of gripper 20. Shown are metal plate and/or heat sink 35, which in one embodiment has attached thereto a printed circuit board ("PCB") comprising various components of depth or three-dimensional perception camera system 30, such as camera sensors 32 and 34, light projector 36, and first computing device or camera processor 50 (which in one embodiment is a microcontroller, controller, processor and/or CPU such as an INTEL® REALSENSE™ Vision Processor D4—see FIG. 6). In addition, in one embodiment, palm 22 comprises metal plate or heat sink 35, or some portion thereof. As those skilled in the art will appreciate after having read and understood the present specification and drawings, palm 22 can assume numerous different configurations and embodiments which fall within the scope of the various inventions described and disclosed herein. Further as shown in FIG. 5, in one embodiment, second computing device 52 comprises a processor, controller, microcontroller, and/or CPU (such as a system-on-a-module) attached to the underside of palm 22, while peripheral break-out device 51 comprising, for example, Ethernet and USB connections, is likewise attached to the underside of palm 22.

In the embodiment shown in FIG. 5, palm 22 is configured to permit various elements and components of gripper 22 to be attached thereto, therein, and/or thereon, including motors or actuators 61a and 61b (which drive and control motor shafts 62a and 62b), which in the embodiment illustrated in FIG. 5 operate under the control of third computing device 54 (which in one embodiment is a computer interface operably connected between second computing device 52 and controllers, microcontrollers, processors and/or CPUs configured to control the operation of motor 61a and 61b (not shown in FIG. 5). In the embodiment shown in FIG. 5, palm 22 also comprises upper plate 24, to which are mounted or attached, or disposed upon or to, various components of gripper 20 such as upper enclosure 38a, depth camera system 30, third computing device 54, motors 61a and 61b, and motor shafts 62a and 62b. in one embodiment, sandwiched between upper plate 24 and lower plate 26 of palm 22 are at least some of the components comprising mechanical manipulation system 40. In the embodiment shown in FIG. 5, and as discussed above, attached or mounted upon or to lower plate 26 are second computing device 52, peripheral break-out device 51, and lower enclosure 38b. In the embodiment of FIGS. 3 through 5, space 28 between upper and lower plates 24 and 26 can be configured to permit air to circulate, and heat to dissipate from, the area or volume between plates 24 and 26.

Continuing to refer to FIGS. 3 through 5, there is illustrated one embodiment of a two-finger gripper 20 with two independently controlled fingers 41a and 41b, an integrated three dimensional (or "3D") perception system or depth camera 30 comprising camera sensors 32 and 34, light projector 36, first computing device 50, and metal plate or heat sink 35 to which a PCB or other substrate comprising the foregoing elements and components is operably attached or mounted. In some embodiments, wrist 14, which may or may not be included in, or attached to, the various embodiments of gripper 20, is rotatable or translatable with respect to robot arm 12 (not shown in FIGS. 3-5), and permits other portions of gripper 20 to rotate or move with respect to robot arm 12.

In the embodiment of gripper 20 shown in FIGS. 3-5, mechanical manipulation system 40 comprises four-bar linkages 43, 44 and 45 connecting fingers 41 to internal actuators or motors 61 and motor actuator shafts 62 housed on and between plates 24 and 26, leaving free space or volume 28 therebetween for ventilation. In the embodiment illustrated in FIGS. 3-5, plates 24 and 26 form upper, lower, front, rear, and side surfaces of palm 22. As noted above, palm 22 acts as a mounting and connecting means for attaching various components to gripper 20. Mounting these various components to palm 22 of gripper 20 permits gripper 20 to very accurately sense and grip objects that are very close to fingers 41 and to other portions of gripper 20, more about which is said below. By way of non-limiting example, plates or other portions of palm 22 can be formed of plastic, carbon, composites, laminates, and other suitable materials.

In one embodiment, four-bar linkage 40 is mounted in between two metal plates 24 and 26 shown in FIGS. 3 through 5. Actuators 61 and third computing device 54 are mounted to one metal plate 24, while second computing device 52 and peripheral break-out device 51 are mounted to other plate 26. Metal plates 24 and 26 can also be configured to serve as heat-sinks for depth camera 30, actuators 61, and computing devices 50, 52 and 54. Space 28 between metal plates 24 and 26 allows air to circulate between them, improving the removal of heat. In one embodiment, both metal plates 24 and 26 are connected to vertical plate 15, which in turn can be connected to robotic wrist 14 and robotic arm 12 using, for example, screws. Other embodiments might use a snap-on mechanism for rapid tool change.

The various links of four bar linkage 40 and mounting plates 24 and 26 can be formed or cut from metal sheets, require only limited post-processing such as tapping holes, and can be assembled using minimal labor. Some examples of four-bar linkages that can be employed in some of the various embodiments disclosed and described herein are found in International Patent Application WO 2913/075245 to Allen Demers published on May 30, 2013, which is entitled "A Gripper Having a Two Degree of Freedom Underactuated Mechanical Finger for Encompassing and Pinch Grasping" (the "'245 patent publication"), a complete copy of which is submitted on even date herewith pursuant to an Information Disclosure Statement filed in the present patent application. The entirety of the foregoing '245 patent publication is hereby incorporated by reference herein.

Continuing to refer to FIGS. 3 through 5, it now becomes clear that the present application relates to systems, devices, components, and methods for grasping and manipulating objects using a robotic arm 12 having an end-effector or gripper 22, which is typically (although not necessarily) mounted to the end or other portion of a robotic arm 12. Such an arm 12 might operate in stand-alone fashion, or might be part of a larger robot system.

In one aspect, gripper 22 comprises at least two fingers 41a and 41b, which in one embodiment are configured to move independently of one another, and that are each connected to corresponding motors 61a and 61b and corresponding motor or actuator shafts 62a and 62b via mechanical manipulation system 40, which in the embodiments illustrated in the Figures is a four-bar linkage. Those skilled in the art, upon having read and understood the present specification and drawings, will understand that many other embodiments of mechanical manipulation system 40 are contemplated and fall within the scope of the various embodiments, including, but not limited to, mechanisms that include one or more of screwing mechanisms, elastic bands or members, plungers, suction cups, sticky or adhesive materials, bolts, frames, sliding mechanisms, rotatable or translatable mechanisms, ands combinations, variations, and permutations thereof. Gripper 20 can be configured to include 1, 2, 3, 4, 5 or more fingers, depending upon the particular application at hand. See, for example, "Robotiq 3-Finger Adaptive Robot Gripper Instruction Manual," Robotiq 2008-2018," which describes one embodiment of a robotic gripper having 3 fingers that can be adapted for use in some embodiments of gripper 20 disclosed and described herein, a copy of which publication is filed on event date herewith in an Information Disclosure Statement, the entirety of which is hereby incorporated by reference herein.

In other embodiments, fingers 41a and 41b are configured to operate in conjunction with one another according to a predetermined set of movements. Other embodiments comprise one or more of a parallel mechanism in which two plates are configured to move towards but independently of one another (a "parallel gripper"), or a multi-fingered hand.

In one embodiment, mechanical manipulation system 40 comprising a four-bar linkage is made from a material with high stiffness, such as aluminium sheet metal, or any other suitable metal, metal alloy, plastic, polymer, carbon, laminate, or combination thereof. Other examples of materials that can be employed in a four-bar linkage include hard plastics such as DELRIN and carbon-fiber reinforced composites and laminates. In one embodiment, and as shown in FIGS. 5, 7a and 8, clevis pins 46a and 46b are made from high-performance metals such as stainless steel to minimize wear and increase reliability, and are used as axes in the four-bar linkage mechanism.

Figure 8:
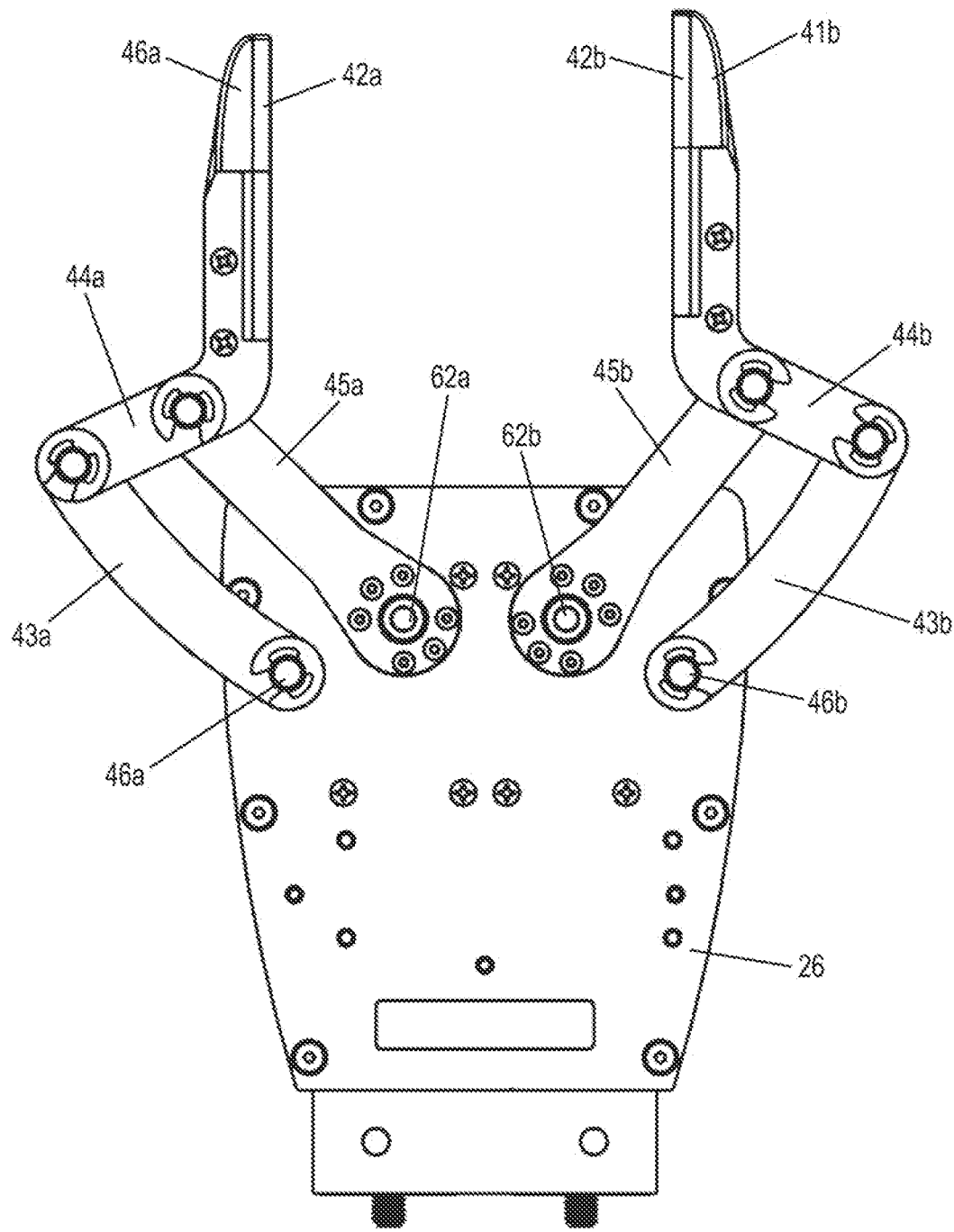

In one embodiment, and as further shown in FIGS. 7a and 8, four bar-linkage 40 for each finger 41a and 41b comprises two metal links 45a and 45b of equal length having holes at each end. First link 45a is operably connected to motor shaft 62a, and second link 43a is configured to pivot around clevis pin 46a at a fixed distance from motor shaft 62a. Both links are connected using clevis pins to a third link 44a that contains two holes for this purpose. Third link 44a further extends at a 135 degree angle to provide a mounting point for finger 41a. The distance between the holes in third link 44a is the same as the distance between motor shaft 62a and the pivot point 46a of first link 43a. Three links 43a, 44a, and 45a and plate 26 that links 43a and 45a are attached to via motor shaft 62a and clevis pin 46a, respectively, form one side of four-bar linkage 40.

Some representative and illustrative, but not intended to be limiting, dimensions in millimeters for the embodiment of gripper 20 shown in FIGS. 3 through 8 are shown in FIGS. 7a and 7b. Those skilled in the art, upon having read and understood the present specification and drawings, will understand that other geometries, configurations, and embodiments that enable smaller or wider openings between fingers 41a and 41b, and thus, by way of example only, increase or reduce the accuracy of control and resulting forces acting on objects 2, are also contemplated and possible. In some embodiments, and according to the particular application(s) that is at hand, the dimensions shown in FIGS. 7a and 7b may be increased or decreased by any one or more of about 5%, about 10%, about 20%, about 30%, about 40%, about 50%, about 60%, about 70%, about 80%, about 90%, about 100%, about 150%, about 200%, about 250%, and more than about 250%. In FIGS. 7a and 7b, an illustrative length of a top surface of palm 22 is 110 mm (length L) and an illustrative width of a top surface of palm 22 is 100 mm (width W), providing a total top surface area of palm of about 10,000 $mm,^2$, as portions of the perimeter of top surface of palm 22 shown in FIGS. 7a and 7b are bowed and curve inwardly. Other lengths L and widths W, and other surface areas of the top surface of palm 22 are of course contemplated. By way of non-limiting illustrative example, in some embodiments length L ranges between about 20 mm and about 400 mm, between about 30 mm and about 300 mm, between about 40 mm and about 250 mm, between about 50 mm and about 200 mm, between about 60 mm and about 150 mm, and between about 70 mm and about 140 mm. By way of further non-limiting illustrative example, in some embodiments length W ranges between about 20 mm and about 400 mm, between about 30 mm and about 300 mm, between about 40 mm and about 250 mm, between about 50 mm and about 200 mm, between about 60 mm and about 150 mm, and between about 70 mm and about 140 mm. By way of still further non-limiting illustrative example, in some embodiments the surface area of the top or bottom surfaces of palm 22 is about 2,500 mm$^2$ about 5,000 mm$^2$, about 7,500 mm$^2$, about 10,000 mm$^2$, about 12,500 mm$^2$, about 15,000 mm$^2$, about 20,000 mm$^2$, about 25,000 mm$^2$, about 30,000 mm$^2$, about 35,000 mm$^2$, about 40,000 mm$^2$, or about 50,000 mm$^2$.

Other dimensions, lengths, widths and surface areas are also contemplated.

In one embodiment, fingers 41a and 41b can comprise 3D-printed plastic parts or "pads" 42a and 42b or a rubber coating to increase friction with an object 2. In one embodiment, rubber or another suitable compliant material is overmolded onto finger 41a and/or 41b. In other possible embodiments, pads or surfaces 42a and 42b are attached to portions of fingers 41a and 41b that are configured to engage objects 2. In one such embodiment, fingers 41a and 41b are mounted to mechanical manipulation system/four-bar linkage 40 using M3 screws. The shape of finger pads 42a and 42b can be configured and customized for different tasks. For example, pincer-like fingers 41a and 41b can be used to manipulate or engage small objects 2, whereas fingers 41a and 41b with larger pads 42a and 42b having, for example, softer or more complaint coatings or surfaces might be more appropriate or suitable for grasping or manipulating a fruit. In other embodiments, finger pads 42a and 42b could also be configured to comprise suction cups that are connected to a vacuum system. In one embodiment, the ability to change the center point of gripper 20 by independently controlling each finger 41a and 41b enables pads 42a and 42b of different widths, lengths and/or thicknesses to be mounted thereon. For example, one pad 42a might be equipped with a suction cup, whereas another pad 42b remains passive, which allows gripper 20 to grasp objects via suction and also using conventional grasping techniques and methods. Fingers 41a and 41b can also be longer or shorter than depicted in the various Figures. Shorter fingers allow gripper 20 to exert larger pressures due to reduced surface area, whereas longer fingers allow camera system 30 to observe object(s) 2 during manipulation and can be configured for the manipulation or grasping of small objects.

In one embodiment, finger pads or surfaces 42a and 42b comprise a rubber or rubber-like material have a low shore hardness ranging, by way of example only, between about 20 and 50 and are configured for passive applications. In other embodiments, pads or surfaces 42a and 42b house optional additional sensors configured to detect contact with object(s) 2 and/or force. Contact and force measurements can then be combined with the torque measurements from each motor in third computing device or interface board 54, resulting in improved control and further augmenting the perception capabilities of gripper 20.

FIGS. 3 through 5 illustrate only one of a number of different configurations and embodiments which palm 22 of gripper 20 can assume. In its various embodiments, palm 22 comprises a plurality of one or more of mounting surfaces, attachment surfaces, mounting points, attachment points, mounting mechanisms, and attachment mechanisms, or combination of such surfaces, points, or mechanisms. Such surfaces, points and/or mechanisms can comprise flat or beveled surfaces or plates, the edges of surfaces or plates, one or more frames or linear elements, holes, recesses, slots, spanning members, meshes, matrices, and so on. Those skilled in the art will appreciate after having read and understood the present specification and drawings that many different combinations, permutations, modifications, and variations of the embodiments of palm 22 disclosed and described herein are possible, and nevertheless fall within the scope of the various embodiments shown and described herein. Palm 22 can be configured in any manner that permits depth camera 30, mechanical manipulation system 40, computing system(s) 50, and motor or actuator system 60 to be mounted operably thereto, thereon, or therein such that fingers 41 can operate effectively and accurately within workspace or target volume 74.

Referring now to FIGS. 3 through 5, in one embodiment robotic gripper 20 is equipped with two infrared camera sensors 32 and 34 and infrared light projector 36 mounted on palm 22 of gripper 20, which together serve as a stereo pair of cameras and an infrared illumination source that provides substantial depth perception capabilities. In one embodiment, and by way of non-limiting example, such a pair of cameras and accompanying infrared projector is an Inte® RealSense™ Depth Camera D415. See datasheet "Intel® RealSense™ Depth Camera D400-Series," September, 2017, Revision 0.7, Copyright© 2017, Intel Corporation, a copy of which is provided pursuant to an Information Disclosure Statement filed on even date with the present patent application, and which is hereby incorporated by reference herein its entirety. In such an embodiment, camera sensors 32 and 34 are configured to operate in the infrared light spectrum and record up to 1280×720 pixels at 90 Hertz. Infrared light projector 36 provides an illumination pattern that facilitates matching of stereo-pairs in environments with few graphical features.

In one embodiment, gripper 20 includes a depth camera 30 that comprises appropriate infrared camera sensors 32 and 34 along with s suitable infrared projector 36, where depth camera 30 is mounted on palm 22 of gripper 20. The stereo camera sensors 32 and 34 can be configured to be sensitive to the visible light spectrum (monochrome), to the infrared light spectrum, or to both spectra. In one embodiment, infrared projector 36 projects a known speckle pattern which helps to identify "stereo matches", or features in the environment that belong to the same point in three-dimensional space, but that might project onto different locations on the image plane. Using an infrared projector is optional, but does help increase accuracy in perceiving depth images when objects 2 are not characterized by sufficient texture.

In one embodiment, depth camera 30 comprises two monocular cameras indicated by 32 and 34, and one projector 36 as in FIG. 5. Camera sensors 32 and 34 are mounted on palm 22 so that they can perceive object 2 grasped by gripper 20 prior to and possibly during grasping operations. In some embodiments, it is desirable to align the virtual center of the joint stereo image as closely as possible to the center of gripper 20, as distortions and calibration errors increase towards the edges of the image plane.

In one embodiment, the center points of stereo camera sensors 32 and 34 and gripper 20 lie within a 75 mm diameter of gripper 20's wrist 14, which can be derived from the millimeter dimensions provided in FIGS. 7a and 7b. In one embodiment, camera sensors 32 and 34 are included in a stereo pair located between about 15 mm and about 36.25 mm from gripper 20's center line, whereas projector 36's center is at most about 15 mm from gripper 20's center line.

Also shown in FIGS. 7a and 7b is palm 22, upon which can be mounted various components of gripper 20, such as stereo camera sensors 32 and 34, light projector 36, second computing device 52, and other components, more about which is said below. Camera sensors 32 and 34, depending upon the particular configuration of gripper 20 that is to be employed, may each be monocular camera sensors, stereo camera sensors, RGB sensors, infrared sensors, visible light sensors, UV light sensors, or some combination of such sensors. Light projector 36 provides infrared, UV, visible light, or any other suitable range of light wavelengths as light projected therefrom. In some embodiments, light projector 36 is mounted not in the center of gripper 20, but above or below camera sensors 32 and 34, allowing camera sensors 32 and 34 to be positioned even closer together.

The minimum and maximum ranges of distances at which a stereo camera system can resolve depth is determined, among other factors, by the distance between the two or more cameras that make up the stereo pair. Generally, the closer the cameras are to one another, the closer the distances that can be resolved by them, and the more reduced their maximum range. The farther the cameras are spaced apart, the greater are the minimum and maximum ranges that can be discerned. Depth is calculated by identifying points in all camera images that belong to the same physical location in 3D space, and then calculating their disparity in the acquired image. The farther an object is away from the camera planes, the lower the disparity between points in the individual images. Once an object 2 moves too close to camera sensors 32 and 34, the object 2 might only be visible in one camera image. Then, calculation of disparity is not possible and the range or distance to object 2 cannot be calculated. Similarly, objects that are too far away and exceed the maximum resolution of the image sensors, zero disparity results, and therefore only an infinite distance reading can be provided.

In one embodiment, the geometry and resolution of the stereo camera sensors 32 and 34 allows distances as low as 11 cm to be measured. The baseline of the camera module (e.g., an Intel Realsense D410 depth camera) is 55 mm. Its field of view (in degrees) is 69.4 (+/−3) horizontally, 42.5 (+/−2) vertically, and 89.3 (+/−3) diagonally. Each individual camera sensor has a resolution of 1920×1080 pixels, an F number of f/2.0 and a focal length of 1.88 mm. The horizontal field of view is 69.4 degrees, the vertical field of view is 42.5 degrees, and the diagonal field of view is 77 degrees. The design of stereo camera systems is well understood, and it is clear to the practitioner how changing various stereo camera parameters (e.g., focal length, baseline distance, etc.) affects fields of view, minimum and maximum distances, and spatial resolution. In short, reducing the field of view allocates more pixels of the image sensor to a reduced area, thereby increasing spatial resolution over a given distance.

Among other things, the resolution of a depth image that results from combining two stereo camera images is a function of the desired range of distances in depth images. In the Intel Realsense family of depth cameras, the minimum depth is 105 mm at a resolution of 424×240 pixels in a combined depth image. This minimum range increases to up to 450 mm at a resolution of 1280×720. These values are partially the result of proprietary algorithms employed in the processing unit of the depth camera system 30, and are reported here as an example of the accuracy and resolution that can be achieved during robotic manipulation.

Figure 6A:
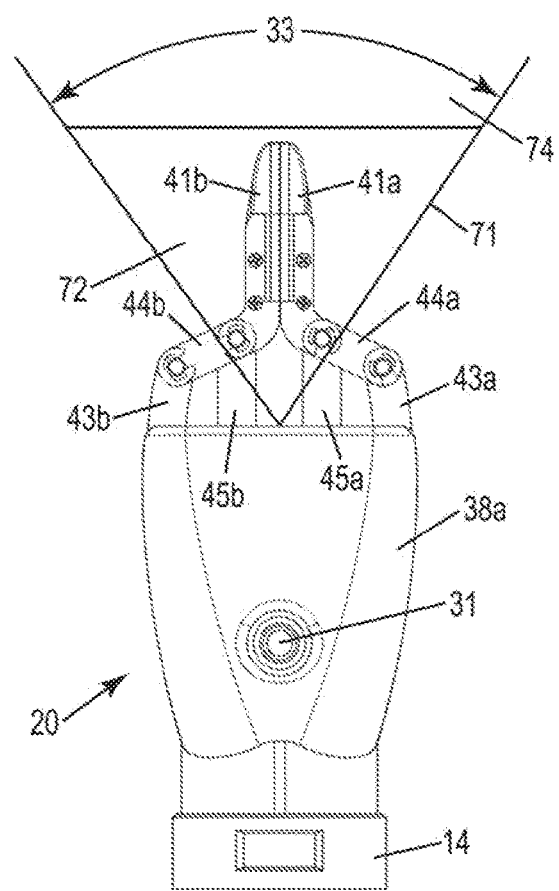
FIGS. 6a and 6b show one embodiment of depth camera system 30's field of view and minimum range.
Figure 6B:
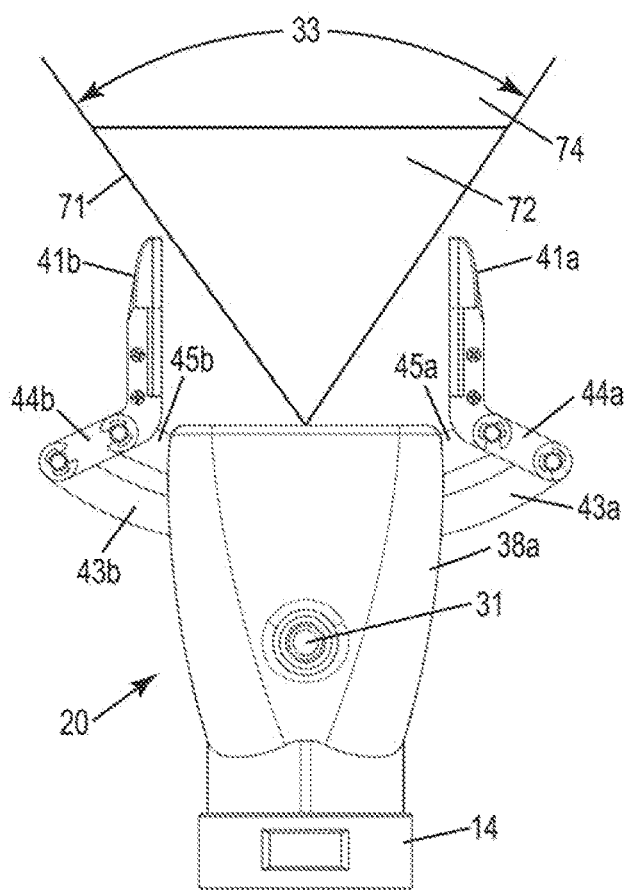

One embodiment of a depth camera's field of view and minimum range is shown in FIGS. 6a and 6b, with a minimum range of 11 cm forming a dividing line between areas 72 and 74. In the illustrated embodiment, removable plastic finger tips 42a and 42b extend outwardly about 27 mm from the gripper 20's metal parts. Closed fingers 41a and 41b and objects 2 disposed therebetween do not fall within the minimum 11 cm range. In other embodiments, longer fingers 41a and 41b that extend 4 to 10 cm, or longer, can be mounted to gripper 20. The maximum length of fingers 41a and 41b is only limited by the stiffness of the available materials, with a 10 cm finger length being an appropriate approximate upper limit for plastic fingers, and 25 cm finger length being an appropriate upper limit for metal fingers (such as aluminium, steel or metal alloy fingers).

In some embodiments, depth camera system 30 is not configured to automatically choose the best resolution for a specific range, which instead can be provided by the user, or computed using an appropriate algorithm loaded in and executed by second computing device 52. A user can also specify a "disparity shift" value to depth camera system 30's internal algorithm loaded in first computing device or processor 50, which affects the useful range of the resulting depth image. To reach the minimum range (in one embodiment 11 cm from the gripper 20's outer shell as described above), a disparity shift value of "200" is required. Lower values, down to zero, are required for operational ranges that are further from depth camera system 30.

Given the foregoing numbers, we can calculate the expected spatial resolution and minimum feature sizes that can be discerned and determined in workspace 74 in accordance with some of the selected specific embodiments illustrated and described herein. With a vertical field of view of 42.5 degrees, 240 pixels (vertical resolution when operating at the closest possible range) cover approximately 4.28 cm, resulting in an approximate resolution of 0.356 mm per pixel. Similarly, in the horizontal direction 69.4 degrees project onto 424 pixels, resulting in an approximate resolution of 0.359 mm per pixel. An object of 3.56 mm in size therefore extends over 10 pixels in the image sensor, making even the smallest fasteners and other mechanical parts often employed in industrial practice, discernible and detectable within workspace 74.

This degree of resolution is not only relevant for detecting small objects and features, but also for accurately detecting distances between objects 2 when they are loosely packed, such as in a bin 4. This method of storage is customary in industrial practice, where parts that are required for an assembly or for retail are stored in bins and retrieved individually and placed onto a tray a bag, a task known as "bin picking" and "kitting", respectively. In some cases, even small distances between objects are sufficient to introduce gaps that can be recognized and evaluated accurately with appropriate signal processing techniques.

For example, a team using a Robotic Materials, Inc. gripper 23 at the Industrial Assembly Competition of the World Robot Summit held in Tokyo, Japan between Oct. 17 and 22, 2018, achieved the highest score from among 16 industrial and university teams in the "kitting" category, which required a robot 10 to singulate up to 15 different objects as small as M3 screws and washers from various bins. Other teams used industrial-grade overhead vision systems, and all other teams relied on mechanical techniques to separate small objects (such as grasping multiple objects at once and then separating them using a mechanical jig, such as a funnel, hopper, or industrial screw sorter). Similarly, Robotic Materials, Inc. has demonstrated retrieving typical retail items such as bottles and containers from a tightly packed retail shelf, as well as accurately placing items onto the shelf. Here, 3D perception can be used to determine open spaces into which an object can fit.

Another typical application is the "peg-in-hole" problem, which requires inserting a peg-like object 2, for example a bolt or a screw, into a hole. This task requires locating the hole as well as the object 2 that needs to be inserted. Object 2 must be grasped so that its centerline aligns with that of gripper 20, or—at the very least—so that its exact pose within gripper 20 can be expected to be known. While accurate localization and placement is not sufficient for this task (see below), there is agreement among practitioners that accurate localization and placement are beneficial to quickly and reliably complete a peg-in-hole task. Assuming the task is to insert a bolt of 5 mm diameter into a hole having an appropriate size of 5.2 mm, both the bolt and the hole (assuming a top-down view) span across approximately 14 pixels for a total area of about 152 pixels, allowing gripper 20 to localize both the screw and the hole with submillimeter accuracy and permitting both an accurate grasp of the object and subsequent placement above the hole.

With other sources of uncertainty, including calibration errors due to non-linearities in the camera lens, and limitations of the camera mechanism, submillimeter accuracy may not be sufficient to insert a peg into a hole with a given tolerance. Instead, such a task may benefit from a predetermined programmable compliance that is derived from measuring the position of, and motor torque applied to, each finger 41. Examples of compliant behavior are illustrated in FIGS. 9a through 10c, more about which is said below. During an insertion task, compliance can be set to a high level, that is, fingers 41a and 41b will give way once an object 2 gripper 20 is holding makes contact with the environment. Performing spiraling motions is a well-known practice to accidentally find a hole and then use the equivalent of spring-energy (using either a mechanically or simulated compliant gripper) to slip the peg into the hole.

Compliance can also be used to support bin picking. To prevent collisions with other objects 2, it is desirable to close fingers 41a and 41b as much as possible before gripper 20 enters a bin 4. The opening width of fingers 41a and 41b needs to be set wide enough to grasp an object 2 and have sufficient room to make up for inaccuracies in perception. However, inaccurate perception can also lead to one or both fingers 41a and 41b running into object 2 or a neighboring object or obstacle. Whereas a non-compliant gripper mechanism 20 might disturb contents in a bin 4, gripper 20 and one or both of fingers 41a and 41b can be configured for compliance such that one or both of fingers 41a and 41b is configured to stop when drawing within a predetermined distance of, encountering, touching, or engaging object 2 (as shown in FIGS. 9a through 10c). If hitting a round object off-center, a compliant finger 41a or 41b might even be configured to slide up or down object 3, thereby moving into a more desirable position for grasping.

Whereas non-stereo vision sensors, such as monocular vision sensors, can be configured to obtain acceptable accuracy under some conditions, depth of field sensing capabilities provided by stereo camera systems facilitate improved and more accurate localization in two ways. First, depth is independent of lighting conditions and angle of view, making it easier to perceive an object against a background scene. Secondly, distances in a depth image can be readily computed and are largely independent of the distance between the camera sensors and the object. Contrariwise, to accurately localize an object using a 2D image/monocular camera, the dimensions of object 2 must be known, as the size of object 2 in the image space (in pixels) depends upon distance, which is unknown in a monocular image.

In some of the various embodiments, processing to localize objects 2 in the workspace and environment, and to calculate appropriate poses for the hand to perform grasping, is done on a computer embedded inside or attached to gripper 20. In the embodiments shown in the Figures, this functionality can be provided primarily if not solely by second computing device 52. This reduces the bandwidth of information that needs to leave the hand or gripper 20 for further processing, thereby reducing the amount of cabling and routing for gripper 20, which is a challenge in robotic systems. Unlike high-bandwidth shielded connections that are required to transport high-definition images away from gripper 20, only smaller and less bulky and intrusive cables can be connected to and employed in conjunction with gripper 20, such as USB 3.0 cables, standard power cables (e.g., 48V at 2 A cables), and standard communication cables (e.g., 100 Mbit/s Ethernet cables), all of which are widely supported and available. Such reduced cabling significantly facilitates integration of robot 10 with existing or other systems.

In addition, performing most or all necessary processing inside gripper 20 does not necessarily require installation of other computing devices to carry out pose computations. This facilitates retrofitting of existing robotic installations in which additional space for installing a computer has not been foreseen, as well as deployment of gripper 20 on mobile units in which space is limited. This is in strong contrast to current industrial practice, in which vision systems and computing are commonly distributed in the environment, requiring the installation of additional structures and cabling, thereby increasing cost and space requirements, and leading to additional complexity.

In one embodiment, both camera sensors 32 and 34, and projector 36, are mounted on a printed circuit board (PCB) by the manufacturer, which in turn is attached to metal plate 35 (see FIG. 5). A second PCB configured to control camera sensors and light projector 36 can also be mounted on palm 22. Metal plate 35 can also be configured to serve as a heat sink for cameras 32 and 34, and light projector 36, and is operably connected to upper plate 24. Also in one embodiment, metal plate 35 is operably connected to motors 61a and 61b and housings for motor shafts 62a and 62b using, for example, M3 screws, thereby forming a heat barrier between motors or actuators 61a and 61b and forward portions of gripper 20, and positioning such motors or actuators as far away as possible from a point or area where fingers 41a and 41b meet during manipulation of object 2. In other embodiments, a gap is disposed between motors 61a and 61b, and housings for motor shafts 62a and 62b, on the one hand, and 3D perception system 30 on the other hand, so that air can circulate in the gap and thereby provide a cooling effect.

In one embodiment, camera sensors 32 and 34, and projector 36, can be mounted at an angle of about 90 degrees with respect to base plate 24 (although other angles are also contemplated). In such an embodiment, the view axis of camera sensors 32 and 34 is therefore parallel to base plate 24 and can be configured to be off-center with respect to the centerline between fingers 41a and 41b where object 2 is grasped. Such a configuration can be employed to mitigate or reduce the adverse effects of reflections from infrared projector 36 at close distances to object 2. In other embodiments, and as noted above, camera sensors 32 and 34 are mounted at angles different from 90 degrees with respect to base plate 24, and, by way of non-limiting example, are slightly tilted from 90 degrees to emphasize different areas of workspace 74.

FIGS. 6a and 6b show top views of the embodiment of gripper 20 shown in FIGS. 3 through 5, where mechanical manipulation system 40 is shown in two different configurations next to workspace or target volume 74. In FIG. 6a, mechanical manipulation system 40 is shown with fingers 41a and 41b in a closed position, and fingers 41a and 41b located adjacent to and just behind target volume 74. In FIG. 6b, mechanical manipulation system 40 is shown with fingers 41a and 41b in an open position, with fingers 41a and 41b located just outside the perimeter of field of view 71. Among other things, workspace or target volume 74 of FIGS. 6a and 6b is defined by the capabilities of depth camera 30, which depends upon angle 33 over which light from projector 36 can be reflected or backscattered from an object 2 back towards camera sensors 32 and 34 and detected thereby, and the distance between projector 36 and camera sensors 32 and 34 on the one hand, and object 2 (not shown in FIGS. 6a and 6b). As illustrated in FIGS. 6a and 6b, the effective field of view of camera sensors 32 and 34 is about 38.5 degrees as denoted by angle 33 (although other ranges of fields of view are contemplated). In FIGS. 6a and 6b, triangle 71 delineates a cone or area 72 within which objects are too close for cameras 32 and 34 to return measurements, whereas the continuation of the cone, delineated in the illustrated embodiment by workspace 74, indicates a target volume within which objects 2 can be detected by cameras 32 and 34. In one such embodiment, and byway of non-limiting example, the minimum range of sensing distance for cameras 32 and 34 is about 11 cm, and fingers 41a and 41b shown in FIGS. 6a and 6b are not long enough to reach into visible sensing zone 74. In such a case, motions must be planned while camera sensors 32 and 34 are more than 11 cm away from objects 2 and can reliably sense such objects 2 within zone or workspace 74. In a different embodiment, longer fingers 41a and 41b are used to enable gripper 20 to observe an object during manipulation within workspace 74.

In other embodiments, different 3D camera sensors may be used and configured to provide measurements at close ranges on the order of centimeters and resolutions on the order of megapixels. Still other embodiments of 3D perception or camera depth system 30 forgo infrared projection, and rely exclusively on visible light stereo vision to save energy and reduce heat dissipation. Also, object recognition can be improved by adding a third (or even a fourth) camera that has a full-color (RGB) sensor, as for example set described and shown in the aforementioned INTEL REALSENSE D415/D435 publication (see, for example, FIG. 2-5 thereof).

In one embodiment, a "system-on-a-module" embedded computer or computing device (or second computing device) 52 is mounted on plate 24 opposite motors 61a and 61b. In one such embodiment, and by way of non-limiting example, an Nvidia Jetson TX2 module is employed as second computing device 52. The Nvidia Jetson has 256 graphical processing units (GPU) in addition to its main central processing unit (CPU) a 64-bit CPU complex, and 8 GB of LPDDR4 memory with a 128-bit interface. The CPU complex combines a dual-core NVIDIA Denver 2 alongside a quad-core ARM Cortex-A57. The Jetson TX2 module has a footprint of 50×87 mm, 85 grams, and 7.5 watts of typical energy usage. See, for example, "DATA SHEET [PRELIMINARY] NVIDIA Jetson TX2 System-on-Module Pascal GPU+ARMv8+8 GB LPDDR4+32 GB eMMC+WLAN/BT" published by NVIDIA, Copyright 2014-2017, a copy of which is filed with the present patent application in an Information Disclosure Statement, the entirety of which is hereby incorporated by reference herein.

Other embodiments of second computing device 52 can comprise one or more systems-on-a-module that are configured to provide additional, other, or different computing capabilities and parameters than those described above. In particular, a GPU complex can be provided, included in, or added to such a module, which supports high performance parallel computing operations such as are employed in machine learning applications.

In some embodiments, second computing device or system-on-a-module 52 includes or is operably connected to a heat-sink, which can be mounted on or attached to plate 24. An additional PCB or break-out peripheral board 51 (e.g., an Auvidea J90 PCB) can be operably connected to second computing device 52, and configured to break out peripherals such as USB and Ethernet connectors. For example, a USB 3.0 port on PCB 51 can be used to connect to one or more of camera sensors 32 and 34, a USB 2.0 port on PCB 51 can be used to connect to third computing device or interface board 54, and Ethernet and electrical power can be wired to PCB 51 via connector 10.

In other embodiments, different break-out boards might be used that make the peripherals of second computing device or system-on-a-module 52 accessible and provide power conditioning as specified by the system-on-a-module manufacturer. See, for example, "J90 Technical Reference 38255-x, Version 1.2, Preliminary, June 2017," Copyright Auvidea GmbH, 2017, a copy of which is provided pursuant to an Information Disclosure Statement filed on even date with the present patent application, and which is hereby incorporated by reference herein its entirety.

In one embodiment, second computing device 52 is configured to perform all necessary computations to detect objects 2 falling within workspace or target volume 74, and to calculate appropriate grasp poses for gripper 20. Grasp poses, which in one embodiment are calculated and implemented using Cartesian coordinates and angles of rotations around principal axes, are then sent to robotic arm 12, where, for example, second computing device 52 communicates with host robot computing device 58 via Ethernet XML-RPC calls. Other possible embodiments employ different or enhanced physical networks, which can include, but are not limited to, CAN or EtherCAT embodiments.

In one embodiment, four-bar linkage 40 is actuated by two direct-current (DC) electric motors 61a and 61b (see FIGS. 5, 7a, 7b and 8), which translate rotation into linear motion via four-bar linkage 40. Other possible embodiments of motors or actuators 61a and 61b include pneumatic or hydraulic pistons, or other types of actuators, such as actuators based on electro-active polymers or shape-memory alloys. In the embodiments shown in FIGS. 5, 7a, 7b and 8, gripper 20 employs two digital servo motors (e.g., Robotis XM-350) that weigh about 82 grams each, have a gear ratio of 353.5:1, an operating voltage from 11.1-14.8 V, a stall torque from 3.8-4.8 Nm, a stall current from 2.1-2.6 Nm, and a rotational speed at no load from 43-57 RPM. See, for example, a web page converted to a 22-page PDF document entitled XM430-W350-T/XM430-W350-R, which describes technical specifications, instructions for use, and applications of Robotis XM-350 and 430 digital servo motors, a copy of which is filed on even date herewith in an Information Disclosure Statement, and which is hereby incorporated by reference herein, in its entirety. In other embodiments, other digital servo motors are used that combine an efficient DC motor, a reduction gear, and the ability to measure position and torque.

In one embodiment, actuators or motors 61*a* and 61*b* operate in conjunction with one or more motor controllers, such as a computing device, controller, microcontroller, computer, processor, microprocessor and/or CPU that is configured to regulate position, force or torque, or two or three of such parameters of motors 61*a* and 61*b* at the same time. In one embodiment, such a controller is an ARM CORTEX M3 72 MHz processor, and is located within each motor housing where it processes force, torque and/or position measurements. These measurements are then used by a feedback controller to control position, current, or both. See, for example, the publication "LPC15xx 32-bit ARM Cortex-M3 microcontroller; up to 256 kB flash and 36 kB SRAM; FS USB, CAN, RTC, SPI, USART, I2C Rev. 1.1-29 Apr. 2015, Product data sheet," a copy of which is filed on even date herewith in an Information Disclosure Statement, and which is hereby incorporated by reference herein, in its entirety.

In one embodiment, such a motor controller is configured as a Proportional-Integral-Derivative (PID) controller, with parameters typically provided by the manufacturer. In position control mode, the motor controller provides current to the motors until a certain position is reached. The controller might need to reverse current to hold the achieved position. The maximum amount of current that the controller is allowed to apply determines the perceived "stiffness" of the controller. A high threshold for the maximum current requires a large external moment to alter the position of the motor shaft, whereas a low threshold for the maximum current requires only a small external moment. Once the external moment is removed, the controller brings the motor shaft back to the set position. This ability permits finger to be programmed to behave as if it were connected to motor shaft 62*a* or 62*b* via a torsional spring with tunable stiffness, an approach also known as impedance control. Specifically, if the maximum torque is high, finger 41*a* or 41*b* behaves as if connected to motor shaft 62*a* or 62*b* using a spring with high stiffness. If the maximum torque is low, finger 41*a* or 41*b* behaves as if connected to motor shaft 62*a* or 62*b* using a spring with low stiffness.

In current control mode, such a motor controller can be configured to apply a fixed amount of current, which results in rotation of the motor shaft until an external moment is achieved that is large enough to cancel the torque that corresponds to the fixed amount of current. By way of illustrative example, such an external moment can result from finger 41*a* or 41*b* running against object 2 with sufficient weight and friction against the ground. Both motor controllers can be connected to third computing device or interface board 54, which in one embodiment comprises a Robotis OpenCM board 6 operably connected via an RS485 asynchronous serial bus to main robot controller 58 and/or to second computing device 52. Third computing device or interface board 54 can also be configured to include a microcontroller configured to communicate with motors 61*a* and 61*b*, and additional robot host computer 58. In other embodiments, third computing device or interface board 54 is a different processor, controller, microcontroller, and/or CPU having properties similar to, or integrated into, host computer 58. See FIGS. 11 and 12.

Third computing device or interface board 54 allows a user to control both fingers 41*a* and 41*b* simultaneously with commands such as "open" and "close," or each to control each finger individually with commands such as "set finger 1's position to 45 degrees" or "set finger 1's maximum torque to 1 Nm". When controlling for maximum torque, fingers 41*a* and 41*b* can be configured to keep closing until a maximum predetermined torque is reached without further input from third computing device or interface board 54, main robot controller 58, or the user. If the maximum torque is low enough and the weight and surface friction of object 2 is high enough, the motor controller or third computing device 54 can be configured to stop motion of finger 41*a* or 41*b* once contact with object 2 has been made. This is advantageous if contact occurs earlier than expected (for example, due to inaccurate perception of object 2). At the same time, a finger opposite object 2 will keep moving until contact is made therewith, even if contact with object 2 occurs later than expected.

Third computing device or interface board 54 may also be configured to detect events such as successful contact with object 2 (by, for example, measuring joint torque), whether object 2 was grasped successful (by for example comparing the distance between fingers 41*a* and 41*b* with the expected size of object 2), or whether finger 41*a* or 41*b* is stuck (by measuring position change after increasing torque).

Figure 9A:
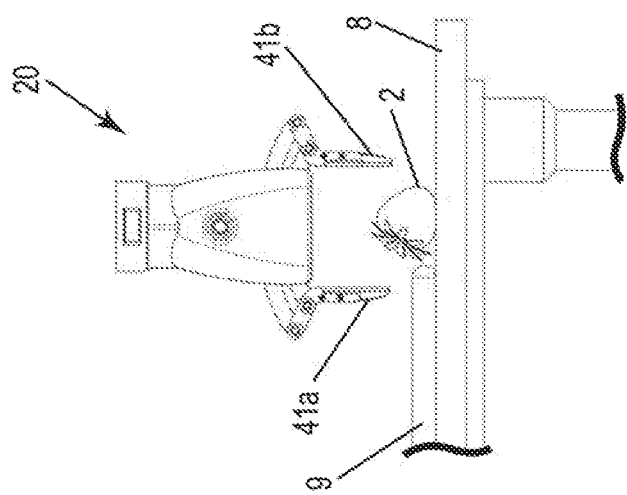
FIGS. 9a through 9c show gripper 20 grasping a strawberry or object 2 using impedance control.
Figure 9B:
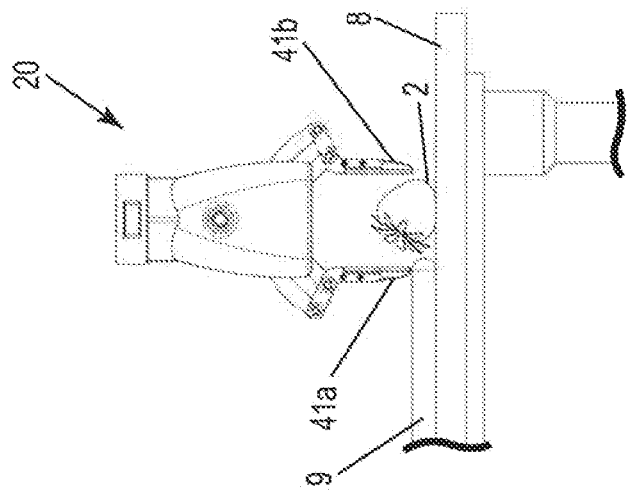
Figure 9C:
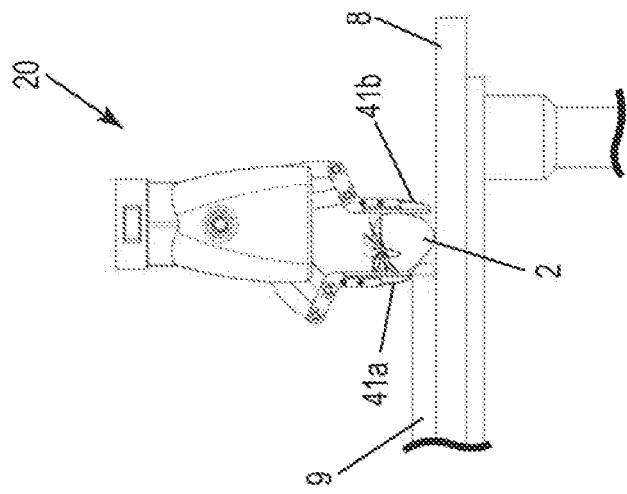

Turning now to FIGS. 9*a* through 9*c*, there is shown gripper 20 grasping a strawberry or object 2 using impedance control. By FIG. 9*c*, the grasp of object 2 is successful, despite one finger 41*a* running into obstacle 9 (FIG. 9*b*), as second finger 41*b* and gripper 20 are configured to push object 2 against immobilized finger 41*a* (see FIG. 9*c*). Continuing to refer to FIGS. 9*a* through 9*c*, there is illustrated one embodiment of the interplay between position and current/force control and using such parameters to sense the state of object 2. Gripper 20 is shown approaching object or strawberry 2 in FIG. 9*a*, which has been located and detected by gripper 20's depth camera system 30. One finger 41*a* runs into obstacle 9, however, as shown in FIG. 9*b*. As fingers 41*a* and 41*b* are independently controlled, one of the fingers, 41*b*, keeps moving, eventually pushing strawberry 2 until it touches the other finger, 41*a* (FIG. 9*c*). At this point, fingers 41*a* and 41*b* both exceed the maximum allowed current and do not squeeze strawberry 2, and yet provide sufficient friction to lift object 2. Robot 10 can now determine whether strawberry 2 was grasped by checking whether fingers 41*a* and 41*b* have been able to attain a desired closing pose after attempting to lift strawberry 2. If fingers 41*a* and 41*b* do not close, object 2 has been successfully grasped. If fingers 41*a* and 41*b* do close, the grasp was not successful.

Figure 10C:
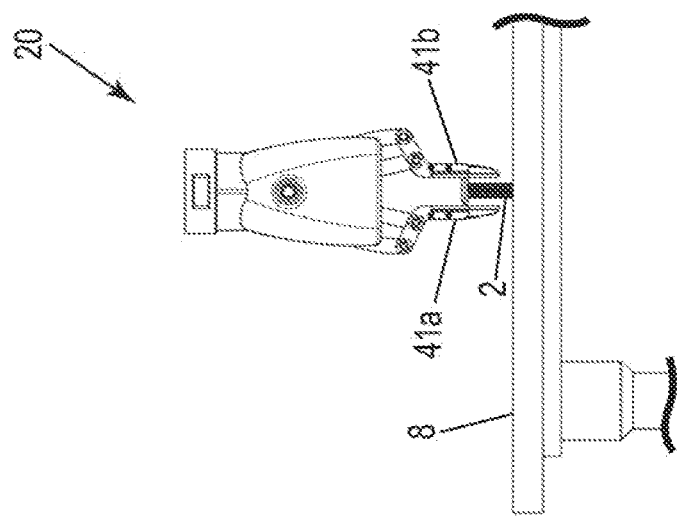
FIGS. 10a through 10c show gripper 20 grasping a screw or object 2 mounted to table 8.
Figure 10B:
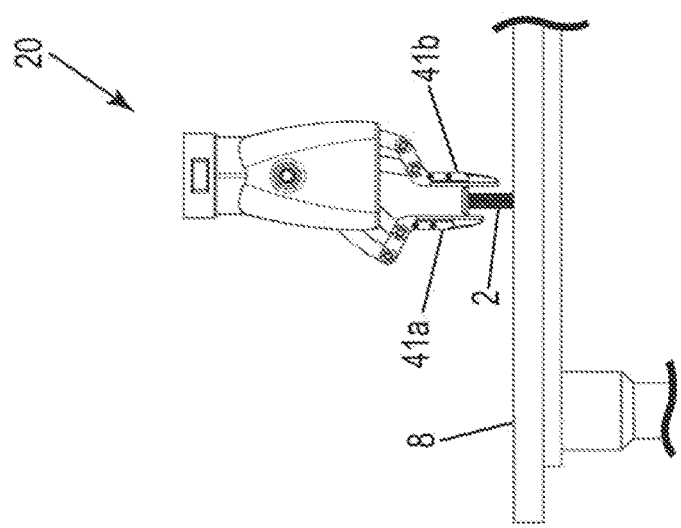
Figure 10A:
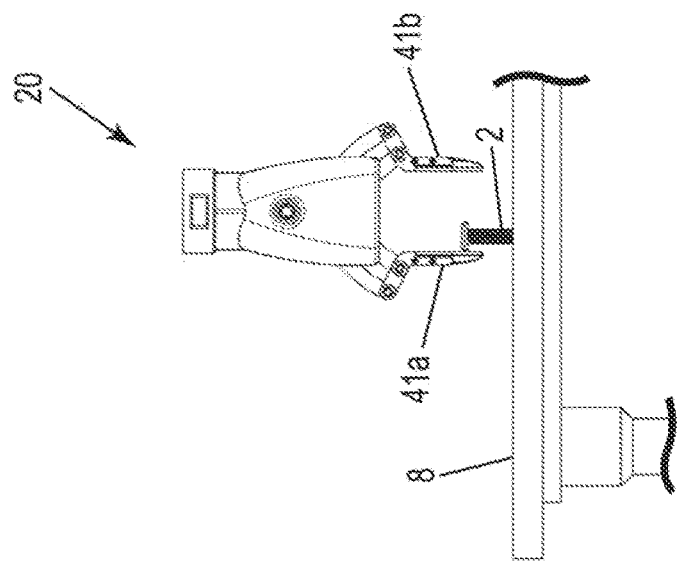

FIGS. 10*a* through 10*c* show gripper 20 grasping a screw or object 2 that is mounted to table 8. Instead of pushing object 2 as in FIGS. 9*a* through 9*c*, impedance control is employed to permit fingers 41*a* and 41*b* conform around object 2 (FIG. 10*b*). The resulting pose can then be used to calculate a lateral corrective motion (FIG. 10*c*) that centers screw 2 beneath gripper 20. Position and current controlled grasping modes can also help with uncertainty in perception, which is also illustrated in FIGS. 10*a* through 10*c*. Gripper 20 approaches screw or object 2 sticking up from table plate 8 and slightly off-center with respect to the initial position of gripper 20 (see FIG. 10*a*). If using only position control, gripper 20 would be unable to reach its desired position as screw 2 is mounted to table 8. Instead of using current control, gripper 20 closes gently around object or screw 2 (FIG. 10*b*). As the poses of fingers 41*a* and 41*b* are known, and the presence of object 2 can be detected by depth camera system 30, gripper 20 can now compute the actual center of object 2 and move into position accordingly (FIG. 10*c*). Note that this action or translation of gripper 20 does not require a regrasp of object 2, as position control keeps fingers 41a and 41b around object 2, whereas current control provides the necessary compliance.

FIG. 10b also illustrates that fingers 41a and 41b are capable of performing lateral motion without engaging robotic arm 12, which is helpful in a peg-in-hole insertion task. Here, gripper 20 can be configured to actively provide lateral motions to support robot 10's seeking behavior, and then to use compliance to conform to the possible displacement between gripper 20's center and the hole location.

In some embodiments, the respective position of fingers 41a and 41b can be measured or determined using a contactless absolute encoder that measures the rotational position of electric motor 61a or 61b with 12-bit resolution, or about 0.08 degrees before gear reduction. In some embodiments, such an encoder can be optical or can rely on a potentiometer attached to the motor shaft. In a current embodiment, force and torque are measured indirectly by measuring the current the electric motor consumes at a resolution of about 2.69 m A from 0 A to 10 A. Other embodiments force and torque are measured more directly using load cells, thereby allowing forces and torques to be measured not only along the motor shaft, but along all six degrees of freedom.

Figure 11:
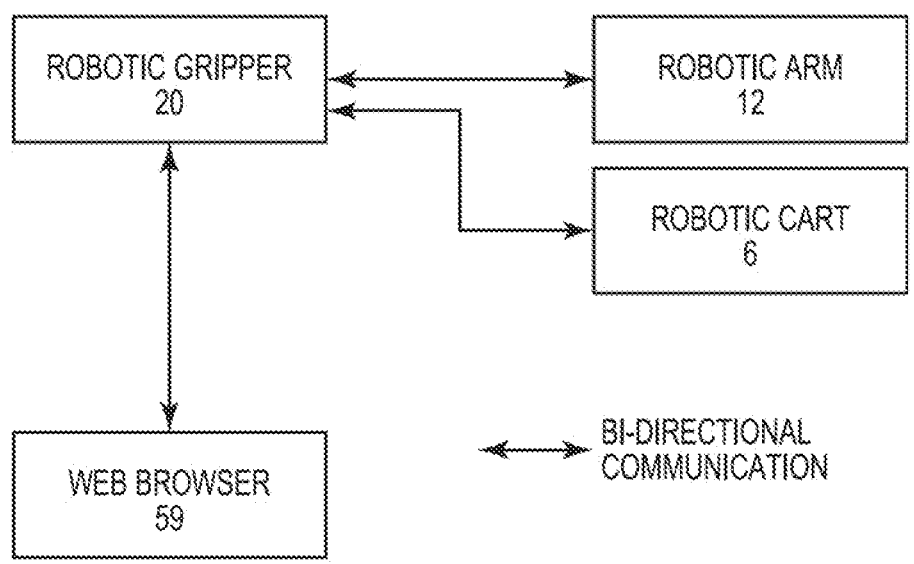
FIGS. 11 and 12 depict two embodiments of operational relationships between gripper 20 and various selected components of a robotic system and a computer system 300.
Figure 12:
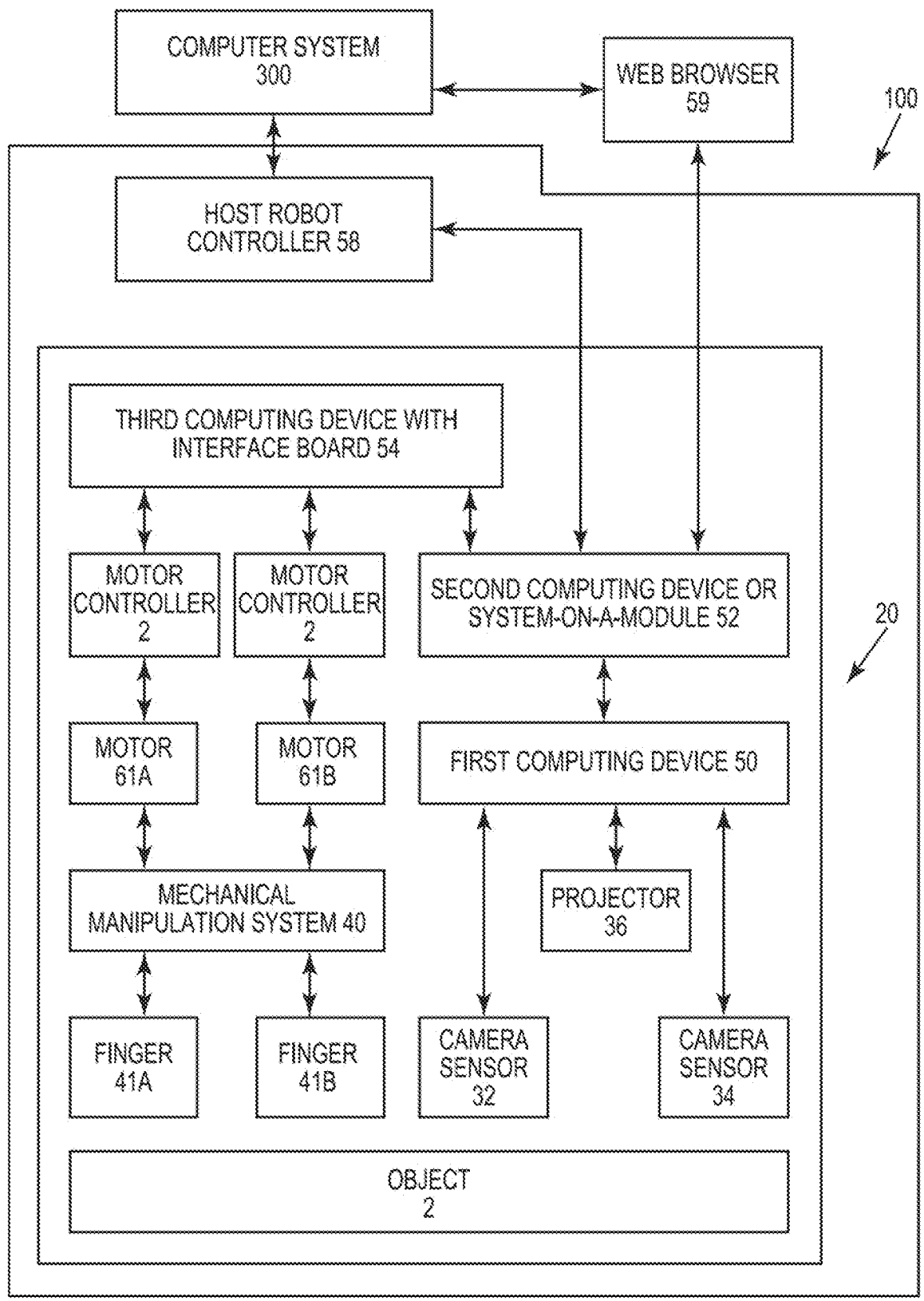

FIGS. 11 and 12 depict two embodiments of the operational relationships between gripper 20 and selected components of a robotic system comprising robotic arm 12 and mobile cart 6, as well as web browser 59, which can be used to display and present a user interface and programming environment for gripper 20. One embodiment illustrating the interdependence between robotic gripper 20, robotic arm 12, and optionally robotic cart 6 (which can provide mobility to the system) is illustrated in FIG. 11. In such an embodiment, user interface and code generation software can be stored in one or more of the computing devices included in gripper 20 and/or robot 10, such as one or more of computing devices 50, 51, 52, 54, and 58, and can be executed inside web browser 59, which in one embodiment supports JavaScript and WebGL for rendering graphics. The user can then configure camera sensors 32 and 34, projector 36, and other components, parameters and software programs, using web interface 59. In one embodiment, once the user is satisfied with the program they have assembled or put together, code that robotic gripper 20 can execute is generated inside web browser 59 and sent to robotic gripper 20 via an XML-RPC call. Gripper 20 can now execute this code on its own, or make the code available to execute via an XML-RPC call from robotic arm 12's controller or robot host computer 58. If gripper 20 executes code by itself, XML-RPC can be used to call methods or query status from arm 12 or cart 6.

In one embodiment, gripper 20 is powered and communicates with host robot 10 and host computer 58 via a combined Ethernet and power port 10. Other embodiments are configured to route power and communication signals directly into robot arm 12. In one embodiment, second computing device or system-on-a-module 52 also provides wireless communication ("Wi-Fi") capabilities, providing an alternative way to communicate with host robot arm 12. In one embodiment, when run in "client mode", gripper 20 can be configured to connect to the same network that to which other robotic devices are connected, and to send control commands and receive their status. In one embodiment, when run in "access point mode", gripper 20 appears as a wireless network to which any Wi-Fi enabled computing system with a web browser can connect. Access point mode can also be a default configuration when gripper 20 is shipped to a customer, which allows the customer to configure the manufacturer and model of robot arm 12, and cart 6 to which robot 10 is mounted.

FIG. 12 illustrates one embodiment of a block diagram for gripper 20, and optional associated host robot controller 58, web browser 59, and computer system 300. Any one or more of gripper 20, host robot controller 58, and web browser 59 may be operably connected to computer 300, more about which is said below. As shown in the embodiment of gripper 20 illustrated in in FIG. 12, gripper 20 comprises a number of different operational components that are mounted on or near, attached to or near, or operably connected to palm 22, including camera sensors 32 and 34, projector 36, first computing device 50, second computing device 52, fingers 41a and 41b, mechanical manipulation system 40, motors 61a and 61b, motor controllers 1 and 2, and third computing device 54.

Figure 13:
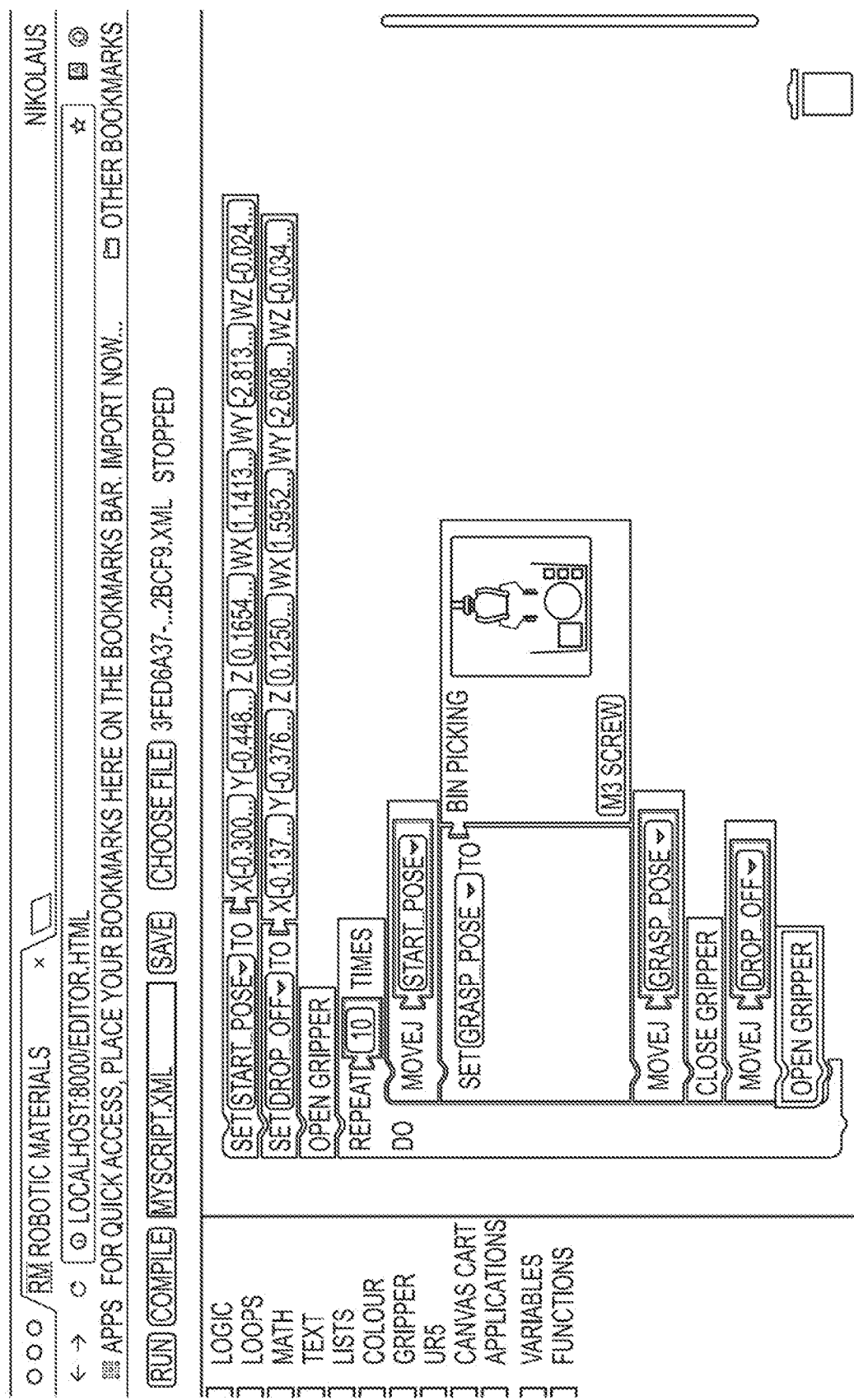
FIG. 13 shows a screenshot of one embodiment of a browser-based graphical programming interface or web browser 69.

FIG. 13 shows a screenshot of one embodiment of a browser-based graphical programming interface or web browser 59. In one embodiment, code, or portions of code, are generated using a graphical programming language based on Google Inc.'s "Blockly". FIG. 13 59 shows an example of how a bin picking task can be configured using such a graphical language. The program sets out by defining two 6-DoF poses "start pose" and "drop off", which are above the bin and the target area, respectively. A third pose "grasp pose" is generated by a block labeled "bin picking" that contains algorithms to generate suitable grasp poses to pick objects out of clutter. This block can be parameterized in a pop-up window that opens after a double-click and labeled for the user to remember, for which item the block has been parameterized. In one embodiment, and in correspondence with the graphical program shown in FIG. 13, robot 10 picks M3 screws. The commands "open gripper" and "close gripper" control the gripper, whereas "MoveJ" issues commands to robot arm 12 to move to a specific 6-DoF pose. Blockly, or another suitable graphical programming interface, can then automatically compile instructions into Python, or another suitable programming language. In this example, and in one illustrative and non-limiting embodiment, the graphical program results in the following pseudo-code:

```
start_pose = [-0.300, -0.448, 0.1654, 1.4113, -2.813, -0.024]
drop_off = [-0.137, -0.376, 0.1250, 1.5952, -2.608, -0.034]
open_gripper( )
for I in range(10):
    movej(start_pose)
    grasp_pose=bin_picking("M3 Screw")
    movej(grasp_pose)
    close_gripper( )
    movej(drop_off)
    open_gripper( )
```

Here, "M3 Screw" is the label to a dictionary entry (in the Python language) that contains parameters describing such an object, whereas the 6-dimensional position vectors are one of many suitable end-effector poses where the robot should move when starting the task (start_pose) and when dropping the object (drop_off).

The foregoing program is now used to further explain how the components identified in FIG. 12 interact. After editing and uploading or remotely executing a program in second computing device or system-on-a-module 52 as previously described, the program is executed in second computing device 52. Any command that controls the mechanical manipulation system, such as for example "open_gripper", will send appropriate commands to the third computing device with interface board via a serial interface or another suitable connection. Each command consists of a letter and one or more parameters. For example, and according to one non-limiting illustrative embodiment, the open_gripper routine that is executed by second computing device 52 is as follows:

```
function open_gripper( )
   write(serial,"0") // send the character "0" to 3rd computing device
```

According to one non-limiting illustrative embodiment, a function that allows second computing device 52 to read the force that is exerted on a finger has the following pseudo-code:

```
int get_left_finger_force( )
   write(serial,"F") // send the character "F" to 3rd computing device
   write(serial,"L") // send the character "L" to 3rd computing device
   return(read(serial))
```

Other functions that follow a similar patterns are closing the gripper, closing gripper 20 not to exceed a maximum force, setting the angle of individual fingers, reading the angle of individual fingers, and combinations thereof.

At the same time, a program is running on third computing device 54, which waits for commands to be sent from second computing device 52. One embodiment of pseudo-code that implements a state machine to process the commands open_gripper( ) and get_left_finger_force( ) is as follows:

```
while(true):
   c=read(serial)
   if c == "0"
      send open_angle to motor controller 1
      send open_angle to motor controller 2
   else if c == "F"
      p=read(serial)
         if p == "L"
            send force reading request to motor controller 1
            store result in f
         else if p == "R"
            send force reading request to motor controller 2
            store result in f
         write(serial,f) // send value of f back to second computing device
```

Those skilled in the art will now understand that there are multiple ways third computing device 54 can be connected to different motor controllers. In the illustrated embodiment, both Motor Controller 1 and Motor Controller 2 are connected to an RS-485 serial bus. Sending commands to each motor controller and reading values from them involves a similar protocol that consists of sending specific character strings onto the bus and reading therefrom. For illustrative non-limiting details according to some embodiments, see the Robotis publication OpenCM 9.04 API Reference, which is filed on even date herewith with the present patent application in an Information Disclosure Statement, and which is hereby incorporated by reference herein in its entirety. These commands are finally executed by the computing devices included in Motor Controllers 1 and 2 (the aforementioned ARM computing platform), which implement appropriate position and/or force feedback controllers to drive the motors 61a and 61b to desired angles and force values.

Returning to the pseudo-code of the example bin picking application, the next command that second computing device 52 executes is movej(start_pose). In one embodiment, second computing device 52 is connected to a Universal Robot UR5 by means of an Ethernet connection. The UR5 robot is equipped with a computing device, which listens to this Ethernet connection and provides an application programming interface, which allows an user to send commands to move robot 10 to a specific position, set the speed and other parameters with which this motion should take place, and read the forces and torques at wrist 14. In case the force and torque measurement range and accuracy of the built-in sensors is not sufficient, robotic arms 12 can be augmented with $3^{rd}$ party force/torque sensors, such as for example the OnRobot HEX-E sensor. In the remainder of this description, we assume these measurements are available and accurate enough to handle the object of interest 2. According to one non-limiting illustrative embodiment, pseudo-code, commands sent to robot 10 (and an attached force sensor) are as follows:

```
function movj(pose)
   open ethernet connection "socket" with robot addess
   write(socket,"movej [pose]")
   close(socket)
force_vector get_force( )
   open ethernet connection "socket" with force sensor address
   write(socket,"getforce")
   return(read(socket))
```

Finally, in the example program, will a "grasp pose" is computed by calling a high-level routine to find object 2, which is defined by a series of parameters, which in one embodiment is represented by the dictionary "M3 Screw". Finding object 2 and localizing its pose requires obtaining an image and depth map, also known as 3D point cloud, from first computing device 50 by exchanging commands and data via a "SuperSpeed" universal serial bus (USB 3.0). Here, first computing device 50 computes a depth map by matching features that correspond to identical physical locations that are observed by camera sensor 32 and camera sensor 34. Projector 36 can help to dramatically increase the number of features by projecting a "speckle pattern" or grid pattern that can be generated by first computing device 50. In one embodiment, first computing device 50 accepts a number of parameters such as the required resolution, or frame rate that influences the amount of data the computing device 50 generates. An additional parameter, disparity shift, needs to be adapted to the distance object 2 is at if object 2 is very close (e.g., about between 10 and about 30 cm) to the front of the camera sensors, which is typical in a robotic manipulation context. In case this is initial distance is unknown, for example when looking into a deep bin that could be either full or empty, the disparity shift can be tuned automatically using a simple search. According to one non-limiting illustrative embodiment, pseudo-code for a linear search can be implemented as follows on second computing device 52:

```
function get_beat_disparity_shift ( )
   maxpoints=0
   bestd=0
   for d in range (10, 50, 5): // count from 10 to 50 in steps 5
      set_disparity_shift(d)
      depth=get_depth_image( )
      points=number of valid depth points
      if (points>maxpoints)
         maxpoints=points
         bestd=d
```

```
        end
    end
    return bestd
```

The foregoing algorithm takes advantage of the fact that poor choices of the disparity shift parameter will yield large numbers of image points for which depth points cannot be calculated. The above algorithm tries different values for the disparity shift and stores the parameter that yields the most valid depth readings. Once point cloud data is available, the bin picking subroutine tries to find a suitable object 2 to grasp. This typically requires multiple steps, such as:

1. Identify the part of the point cloud that is outside the bin and remove it.
2. Identify the bin using the known bin geometry and remove the walls and rim from the point cloud.
3. Segment the remaining points into different objects.
4. For each object, compare dimensions with those of the desired object.
5. Calculate the object center and calculate a point above it so that the object will end up between the gripper's finger upon closing the gripper at this position
6. Return pose.

The segmentation step can rely on the fact that all points that are a certain minimal distance apart are part of the same object. What this minimum distance is, is object specific and a parameter of the bin picking routine. A well-known algorithm to find clusters of points that are close together is DBSCAN. This algorithm is well known and part of a variety of open source software packages, such as scikit-learn. Alternatively, one can calculate surface normals for each point in the point cloud and cluster points based on surface normals with similar angles. This approach might work better for objects with flat surfaces, such as boxes, whereas the distance-based segmentation result can work better for round objects. Which segmentation routine to use can be also part of the parameters that are stored with each object. Finally, individual objects might also be recognized using scale-invariant image features such as SIFT or ORB, which are part of open-source image processing software toolkits such as OpenCV.

Using a graphical programming interface can be advantageous, as it has been shown to lower the barrier of entry for novice users and allows them to become productive quickly. This can be particularly important in the various embodiments disclosed and described herein, which allow workers to quickly configure and reconfigure robots to support them as they undertake and execute during industrial tasks. To make programming interface 59 more accessible, second computing element 52 can also be configured to serve as a webserver that can be accessed by a web browser connected to the same network. In one embodiment, all functions that gripper 20 provides, including the operation of gripper 20, the detection of objects 2, and the generation of grasp poses, are viable as building blocks in the Blockly or other suitable language, and can be combined with arbitrary program logic. The resulting code can then either be executed stand-alone, that is gripper 20 has full control over robot arm 12, or launched from proprietary robot control software as long as such software is appropriately configured to call appropriate external programs.

Figure 14:
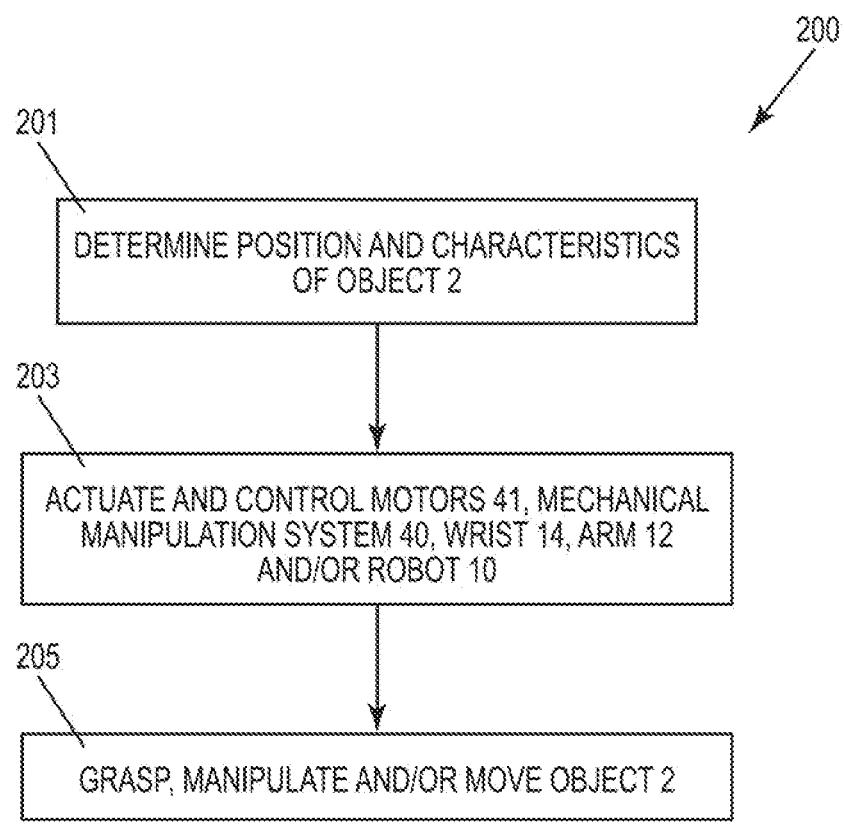
FIG. 14 shows one embodiment of a method 200 that may be employed using gripper 20.

FIG. 14 shows one embodiment of a method 200 that may be employed using gripper 20. According to one embodiment, method 200 comprises step 201 of determining the position and characteristics of object 2, step 203 of actuating and controlling one or more of any of motors 41, mechanical manipulation system 40, wrist 14, arm 12, and robot 10, and step 205 of grasping, manipulating, and/or moving object 2.

Figure 15:
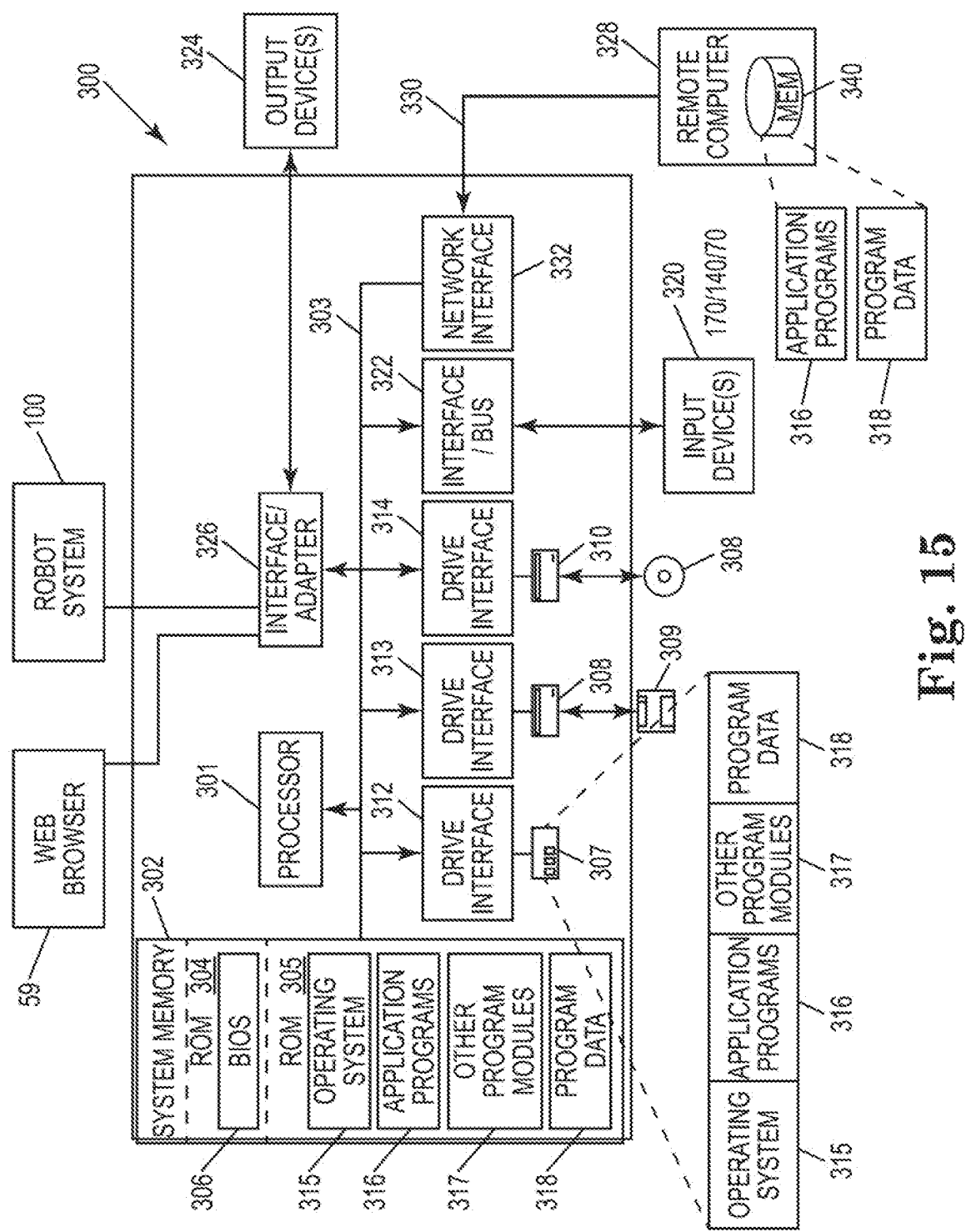
FIG. 15 shows one embodiment of an illustrative computer system 300.

FIG. 15 shows one illustrative non-limiting embodiment of a computer system 300. In view of the structural and functional descriptions provided herein, those skilled in the art will appreciate that portions of the described devices and methods may be configured as methods, data processing systems, and/or computer algorithms. Accordingly, these portions of the devices and methods described herein may take the form of a hardware embodiment, a software embodiment, or an embodiment combining software and hardware, such as shown and described with respect not only to computer system 300 illustrated in FIG. 15, but other computing devices described and disclosed herein, including, but not limited to, first computing device 50, second computing device 52, third computing device 54, host robot controller or computer 58, web browser 59, or any other suitable data processing apparatus. Furthermore, portions of the devices and methods described herein may be a computer algorithm or method stored in a computer-usable storage medium having computer readable program code on the medium. Any suitable computer-readable medium may be utilized including, but not limited to, static and dynamic storage devices, hard disks, optical storage devices, and magnetic storage devices.

Certain embodiments of portions of the devices and methods described herein are also described with reference to block diagrams of methods, systems, and computer algorithm products. It will be understood that such block diagrams, and combinations of blocks diagrams in the Figures, can be implemented using computer-executable instructions. These computer-executable instructions may be provided to one or more processors of a general purpose computer, a special purpose computer, computer 300, first computing device 50, second computing device 52, third computing device 54, host robot controller or computer 58, web browser 59, or any other suitable programmable data processing apparatus (or a combination of devices and circuits) to produce a machine, such that the instructions, which executed via the processor(s), implement the functions specified in the block or blocks of the block diagrams.

These computer-executable instructions may also be stored in a computer-readable memory that can direct computer 300, first computing device 50, second computing device 52, third computing device 54, host robot controller or computer 58, and web browser 59, or any other suitable data processing apparatus such as to function in a particular manner, such that the instructions stored in the computer-readable memory result in an article of manufacture including instructions which implement the function specified in an individual block, plurality of blocks, or block diagram. The computer program instructions may also be loaded onto computer 300, first computing device 50, second computing device 52, third computing device 54, host robot controller or computer 58, and web browser 59, or any other programmable data processing apparatus to cause a series of operational steps to be performed on the computer or other programmable apparatus to produce a computer implemented process such that the instructions which execute on computer 300, first computing device 50, second computing device 52, third computing device 54, host robot controller or computer 58, web browser 59, or any other programmable apparatus provide steps for implementing the functions specified in the an individual block, plurality of blocks, or block diagram.

In this regard, FIG. 15 illustrates only one example of a computer system 300 (which, by way of example, can include multiple, or be connected to multiple, computers or computer workstations, as shown in FIG. 15) that can be employed to execute one or more embodiments of the devices and methods described and disclosed herein, such as devices and methods configured to acquire and process sensor, torque, force or visual data, to process image data, and/or transform sensor or other data and image data associated with the perception and functioning of robotic system, devices and components Any one or more of computer system 300, first computing device 50, second computing device 52, third computing device 54, host robot controller or computer 58, and web browser 59 can be implemented on one or more general purpose computer systems or networked computer systems, embedded computer systems, routers, switches, server devices, client devices, various intermediate devices/nodes or standalone computer systems. Additionally, computer system 300, first computing device 50, second computing device 52, third computing device 54, host robot controller or computer 58, and web browser 59, and/or portions thereof, may be implemented on various mobile devices such as, for example, a personal digital assistant (PDA), a laptop computer and the like, provided the mobile device includes sufficient processing capabilities to perform the required functionality.

By way of illustrative example, and understanding that the above and following descriptions or portions thereof may equally well be applied to first computing device 50, second computing device 52, third computing device 54, host robot controller or computer 58, and web browser 59, in one embodiment, computer system 300 includes processing unit 301 (which may comprise a CPU, controller, microcontroller, processor, microprocessor or any other suitable processing device), system memory 302, and system bus 303 that operably connects various system components, including the system memory, to processing unit 301. Multiple processors and other multi-processor architectures also can be used to form processing unit 301. System bus 303 can comprise any of several types of suitable bus architectures, including a memory bus or memory controller, a peripheral bus, or a local bus. System memory 302 can include read only memory (ROM) 304 and random access memory (RAM) 305. A basic input/output system (BIOS) 306 can be stored in ROM 304 and contain basic routines configured to transfer information and/or data among the various elements within computer system 300.

Computer system 300 can include a hard disk drive 303, a magnetic disk drive 308 (e.g., to read from or write to removable disk 309), or an optical disk drive 310 (e.g., for reading CD-ROM disk 311 or to read from or write to other optical media). Hard disk drive 303, magnetic disk drive 308, and optical disk drive 310 are connected to system bus 303 by a hard disk drive interface 312, a magnetic disk drive interface 313, and an optical drive interface 314, respectively. The drives and their associated computer-readable media are configured to provide nonvolatile storage of data, data structures, and computer-executable instructions for computer system 300. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of the devices and methods described and disclosed herein.

A number of program modules may be stored in drives and RAM 303, including operating system 315, one or more application programs 316, other program modules 313, and program data 318. The application programs and program data can include functions and methods programmed to acquire, process and display data from one or more sensors, such as is shown and described herein.

A user may enter commands and information into computer system 300 through one or more input devices 320, such as a pointing device (e.g., a mouse, a touch screen, etc.), a keyboard, a microphone, a joystick, a game pad, a scanner, and the like. For example, the user can employ input device 320 to edit or modify the data being input into a data processing algorithm or method. These and other input devices 320 may be connected to processing unit 301 through a corresponding input device interface or port 322 that is operably coupled to the system bus, but may be connected by other interfaces or ports, such as a parallel port, a serial port, or a universal serial bus (USB). One or more output devices 324 (e.g., display, a monitor, a printer, a projector, or other type of display device) may also be operably connected to system bus 303 via interface 326, such as through a video adapter.

Computer system 300 may operate in a networked environment employing logical connections to one or more remote computers, such as remote computer 328. Remote computer 328 may be a workstation, a computer system, a router, or a network node, and may include connections to many or all the elements described relative to computer system 300. The logical connections, schematically indicated at 330, can include a local area network (LAN) and/or a wide area network (WAN).

When used in a LAN networking environment, computer system 300 can be connected to a local network through a network interface or adapter 332. When used in a WAN networking environment, computer system 300 may include a modem, or may be connected to a communications server on the LAN. The modem, which may be internal or external, can be connected to system bus 303 via an appropriate port interface. In a networked environment, application programs 316 or program data 318 depicted relative to computer system 300, or portions thereof, may be stored in a remote memory storage device 340.

The following related provisional patent application document provides additional information regarding some of the various embodiments, U.S. Provisional Patent Application Ser. No. 62/686,055 entitled "A robotic hand with integrated 3D perception and individually controlled fingers for autonomous manipulation" filed on Jun. 17, 2018 ("the '055 patent application"). From the '055 patent application, one skilled in the art can readily calculate, deduce and infer, as the case may be, many of the specific angles, dimensions, ranges of dimensions, and ranges of angles disclosed and described herein, more about which is said below. Another related provisional patent application is U.S. Provisional; Patent Application Ser. No. 62/744,855 entitled "Robotic Rotating Tool for Screwing and Drilling with Attachment Mechanism" to Miller filed on Oct. 12, 2018 ("the '855 patent application"). In the '855 patent application, an additional motor is provided that gripper 20 and robot arm 12 can pick up, and which can then serve as a screwdriver or drill.

Furthermore, note that the embodiments of gripper 20 shown in the Figures of the '055 patent application and discussed in certain portions hereof do not contain a motor configured to rotate wrist 14 with respect to robot arm 12. Instead, robot arm 12 provides the required degree of rotational freedom. It is contemplated, however, that various embodiments of gripper 20 can include a motor and/or other mechanisms and components required to effect suitable rotation of gripper 20 with respect to robot arm 12.

Note that the various computing devices disclosed and described herein such as first computing device 50, peripheral break-out board 51, second computing device 52, and third computing device 54 may also be combined into single or dual processors mounted on, in, or to gripper 20.

U.S. Patent Application Publication No. 2018/0361589 to Paquin et al. filed on May 22, 2018 and entitled "Robotic Arm Camera System and Method" is hereby incorporated by reference herein, in its entirety.

It will now be seen that the unique, novel and compact gripper 20 disclosed and described herein provides numerous advantages owing to the close proximity in which its various components are located with respect to an object 2 that is to be sensed and gripped or otherwise manipulated or moved by gripper 23. Sensing of one or more objects 2 is improved by depth camera system 30, and its associated camera sensors and projector(s) being mounted on or near palm 22, and thus being positioned very close to object 2, which permits enhanced and quicker sensing and resolution of an object 2 that is to be detected and manipulated. One or more computing devices 50, 51, 52 and 54 *a* are likewise located in, on or near palm 22, thereby reducing the distances various electrical signals must travel for processing and control of gripper 20. Other advantages are described herein, or will become apparent to those skilled in the art upon having read and understood the present specification, drawings and claims.

The invention claimed is:

1. A three-dimensional perception and object manipulation robot gripper configured for connection to and operation in conjunction with a robot arm, the gripper comprising:
a palm comprising a plurality of at least one of mounting surfaces, attachment surfaces, mounting points, attachment points, mounting mechanisms, and attachment mechanisms, or combination of such surfaces, points, or mechanisms;
a plurality of at least one of motors and actuators mounted to, on or in, or operably connected or attached to, on or in the palm;
a mechanical manipulation system attached to, on or in, or operably connected, to the palm, the mechanical manipulation system being operably connected to the motors or actuators and comprising a plurality of fingers, the plurality of fingers being configured to manipulate one or more objects located within a workspace or target volume accessible by the fingers;
at least two camera sensors mounted to, on or in, or connected operably to, the palm and configured and positioned to sense at least one of reflected and backscattered light having predetermined characteristics originating from a light projector or light source, the at least two camera sensors further being configured to generate and provide input images or signals corresponding to the reflected and backscattered light sensed thereby;
at least one computing device operably connected to the at east two camera sensors and the plurality of at least one of motors and actuators, the at least one computing device being configured and programmed to: (a) at least partially one of control operation, control activation, and control deactivation of the at least two camera sensors; (b) receive and at least partially process or format the input images or signals provided by the at least two camera sensors; (c) generate and provide output images corresponding at least partially to the input images or signals provided by the at least two camera sensors; (d) receive the output images and process the output images to determine the location and orientation of the one or more objects within the workspace; (e) provide as outputs control signals or instructions configured to be employed by the motors or actuators to control movement and operation of the plurality of fingers so as to permit the fingers to manipulate the one or more objects located within the workspace or target volume;
wherein the gripper is configured to rotate or translate in conjunction with a movable robot wrist and robot arm operably connected thereto, and the gripper is configured such that during object grasping, releasing, and moving operations the plurality of fingers operate within a predetermined operational range of distances and angles that define the boundaries of the workspace and target volume.

2. The three-dimensional perception and object manipulation robot gripper of claim 1, further comprising the at least one light projector or source, the at least one light projector or source being mounted to, on or in the palm and configured to illuminate at least partially with fight having the predetermined characteristics the one or more objects located within the workspace or target volume.

3. The three-dimensional perception and object manipulation robot gripper of claim 1, wherein the at least one computing device is further configured and programmed to at least partially one of control operation, control activation, and control deactivation of the at least one light projector or light source.

4. The three-dimensional perception and object manipulation robot gripper of claim 1, wherein the at least one computing device is operably connected to the light projector or light source.

5. The three-dimensional perception and object manipulation robot gripper of claim 1, wherein the mechanical manipulation system comprises a plurality of mechanical linkage mechanisms.

6. The three-dimensional perception and object manipulation robot gripper of claim 4, wherein the mechanical linkage mechanism is a four-bar linkage mechanism.

7. The three-dimensional perception and object manipulation robot gripper of claim 1, wherein the light having predetermined characteristics comprises one or more of infrared light, visible light, and UV light.

8. The three-dimensional perception and object manipulation robot gripper of claim 1, wherein one or more of the at least one computing device comprises a single or dual computing device.

9. The three-dimensional perception and object manipulation robot gripper of claim 1, wherein the gripper is configured such that the plurality of fingers are independently controllable.

10. The three-dimensional perception and object manipulation robot gripper of claim 1, wherein at least one of the plurality of fingers is a finger having a shape, a length, a width, a portion or component, a predetermined function, a hardness or softness, and a surface area configured to be changed or switched by a user.

11. The three-dimensional perception and object manipulation robot gripper of claim 1, wherein the palm comprises at least one planar surface comprising the at least one of mounting surfaces, attachment surfaces, mounting points, attachment points, mounting mechanisms, and attachment mechanisms, or combination of such surfaces, points, or mechanisms.

12. The three-dimensional perception and object manipulation robot gripper of claim 10, wherein the at least one planar surface comprises upper and lower plates.

13. The three-dimensional perception and object manipulation robot gripper of claim 9, wherein the at least one planar surface comprises at least one of metal, a metal alloy or combination of metals, a plastic, a polymer, laminated materials, carbon, carbon fiber, a carbon-reinforced material or composite, KEVLAR, and DELRIN.

14. The three-dimensional perception and object manipulation robot gripper of claim 1, wherein the at least one of motors and actuators comprises one or more of a DC electric motor, a digital servo motor, a pneumatic or hydraulic piston, a solenoid, a reduction gear, a position or orientation sensor, a force sensor, and a torque sensor.

15. The three-dimensional perception and object manipulation robot gripper of claim 1, wherein the at least one of the motors and actuators is operably connected to the at least one computing device or another computing device configured to operate as feedback controller, wherein the feedback controller is configured to regulate or control at least one of position, force, and torque applied by the plurality of fingers to the one or more objects.

16. The three-dimensional perception and object manipulation robot gripper of claim 1, wherein the robot gripper or hand is operably connected to a graphical programming interface accessible by a user or programmer.

17. The three-dimensional perception and object manipulation robot gripper of claim 16, wherein the graphical programming interface is provided by a web browser.

18. The three-dimensional perception and object manipulation robot gripper of claim 1, wherein the gripper is configured to vary controllably at least one of a force, a torque, a stiffness, and a compliance applied by one or more of the plurality of fingers to the one or more objects.

19. A method of manipulating an object located in a workspace using a three-dimensional perception and object manipulation robot gripper configured for connection to and operation in conjunction with a robot arm, the gripper comprising a palm comprising a plurality of at least one of mounting surfaces, attachment surfaces, mounting points, attachment points, mounting mechanisms, and attachment mechanisms, or combination of such surfaces, points, or mechanisms, a plurality of at least one of motors and actuators mounted to, on or in, or attached to, on or in the palm, a mechanical manipulation system attached to, on or in, or operably connected, to the palm, the mechanical manipulation system being operably connected to the motors or actuators and comprising a plurality of fingers, the plurality of fingers being configured to manipulate one or more objects located within a workspace or target volume accessible by the fingers, at least two camera sensors mounted to, on or in, or connected operably to, the palm and configured and positioned to sense at least one of reflected and backscattered light having predetermined characteristics and originating from a light projector or light source, the at least two camera sensors further being configured to generate and provide input images or signals corresponding to the reflected and backscattered light sensed thereby, at least one computing device being operably connected to the at least two camera sensors and the plurality of at least one of motors and actuators, the at least one computing device being configured and programmed to: (a) at least partially one of control operation, control activation, and control deactivation of the at least two camera sensors; (b) receive and at least partially process or format the input images or signals provided by the at least two camera sensors; (c) generate and provide output images corresponding at least partially to the input images or signals provided by the at least two camera sensors; (d) receive the output images and process the output images to determine the location and orientation of the one or more objects within the workspace; (e) provide as outputs control signals or instructions configured to be employed by the motors or actuators to control movement and operation of the plurality of fingers so as to permit the fingers to manipulate the one or more objects located within the workspace or target volume, the method comprising:

rotating or translating the gripper such that during object grasping, releasing, and moving operations the plurality of fingers operate within a predetermined operational range of distances and angles that define the boundaries of the workspace and target volume.

20. The method of claim 19, further comprising the at least one light projector or source, the at least one light projector or source being mounted to, on or in the palm and configured to illuminate at least partially with light having the predetermined characteristics the one or more objects located within the workspace or target volume.

21. The method of claim 19, wherein the at least one computing device is further configured and programmed to at least partially one of control operation, control activation, and control deactivation of the at least one light projector or light source.

22. The method of claim 19, wherein the at least one computing device is operably connected to the light projector or light source.

23. The method of claim 19, further comprising using a plurality of mechanical linkage mechanisms as the mechanical manipulation system.

24. The method of claim 19, further comprising a four-bar linkage mechanism as the mechanical linkage mechanism.

25. The method of claim 19, wherein the light having predetermined characteristics is one or more of infrared light, visible light, and UV light.

26. The method of claim 19, wherein the at least one computing device comprises a single or dual computing device.

27. The method of claim 19, wherein the plurality of fingers is independently controllable.

28. The method of claim 19, wherein at least one of the plurality of fingers is a finger having a shape, a length, a width, a portion or component, a predetermined function, a hardness or softness, and a surface area configured to be changed or switched by a user.

29. The method of claim 19, wherein the palm comprises at least one planar surface comprising the at least one of mounting surfaces, attachment surfaces, mounting points, attachment points, mounting mechanisms, and attachment mechanisms, or combination of such surfaces, points, or mechanisms.

30. The method of claim 19, wherein the at east one planar surface comprises upper and lower plates.

31. The method of claim 30, wherein the at least one planar surface comprises at least one of metal, a metal alloy or combination of metals, a plastic, a polymer, laminated materials, carbon, carbon fiber, a carbon-reinforced material or composite, KEVLAR, and DELRIN.

32. The method of claim 19, wherein the at least one of motors and actuators comprises one or more of a DC electric motor, a digital servo motor, a pneumatic or hydraulic piston, a solenoid, a reduction gear, a position or orientation sensor, a force sensor, and a torque sensor.

33. The method of claim 19, wherein the at least one of motors and actuators is operably connected to the at least one computing device or another computing device configured to operate as a feedback controller, wherein the feedback controller is configured to regulate or control at least one of position, force, and torque applied by the plurality of fingers to the one or more objects.

34. The method of claim 19, wherein the robot gripper or hand is operably connected to a graphical programming interface accessible by a user or programmer.

35. The method of claim 34, wherein the graphical programming interface is provided by a web browser.

36. The method of claim 19, further comprising the gripper being configured to vary controllably at least one of a force, a torque, a stiffness, and a compliance applied by one or more of the plurality of fingers to the one or more objects.

* * * * *